United States Patent
Takayama et al.

(10) Patent No.: US 11,431,271 B2
(45) Date of Patent: Aug. 30, 2022

(54) ELECTRIC MOTOR DRIVE DEVICE

(71) Applicant: Mitsubishi Electric Corporation, Tokyo (JP)

(72) Inventors: Hiroyuki Takayama, Tokyo (JP); Kazunori Hatakeyama, Tokyo (JP); Keiichiro Shizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 252 days.

(21) Appl. No.: 16/631,229

(22) PCT Filed: Oct. 24, 2017

(86) PCT No.: PCT/JP2017/038358
§ 371 (c)(1),
(2) Date: Jan. 15, 2020

(87) PCT Pub. No.: WO2019/082272
PCT Pub. Date: May 2, 2019

(65) Prior Publication Data
US 2020/0252017 A1  Aug. 6, 2020

(51) Int. Cl.
*H02P 25/18* (2006.01)
*H02P 27/06* (2006.01)

(52) U.S. Cl.
CPC ............. *H02P 25/18* (2013.01); *H02P 27/06* (2013.01)

(58) Field of Classification Search
CPC ........ H02P 25/18; H02P 27/06; H02P 25/184; H02P 25/22; H02P 29/027; H02P 25/188
See application file for complete search history.

(56) References Cited

U.S. PATENT DOCUMENTS

| 4,748,355 A * | 5/1988 | Anderson | H02K 5/225 |
| | | | 310/71 |
| 5,864,458 A * | 1/1999 | Duffy | H02H 3/025 |
| | | | 361/10 |
| 11,005,410 B2 * | 5/2021 | Iwazaki | H02P 25/184 |

(Continued)

FOREIGN PATENT DOCUMENTS

JP  2008-228513 A  9/2008

*Primary Examiner* — Muhammad S Islam
*Assistant Examiner* — Devon A Joseph
(74) *Attorney, Agent, or Firm* — Posz Law Group, PLC

(57) ABSTRACT

An electric motor drive device includes: a wire connection switching unit; an inverter; a control device controlling the wire connection switching unit and the inverter; and an overcurrent protection circuit preventing current exceeding a predetermined value from continuously flowing through the electric motor. The overcurrent protection circuit includes: determination circuits each correlated one-to-one with any one of possible wire connection states of a stator winding and determining whether current flowing through the inverter is abnormal; a combining circuit combining determination results; and an invalidation circuit invalidating a determination process by one or more of the determination circuits, and causing the combining circuit to output a determination result by the determination circuit correlated with a selected wire connection state of the stator winding. When the determination result output from the combining circuit indicates an abnormal value of the current flowing through the inverter, the control device stops the inverter.

21 Claims, 17 Drawing Sheets

(56) References Cited

U.S. PATENT DOCUMENTS

| | | | |
|---|---|---|---|
| 2015/0168033 A1* | 6/2015 | Yamakawa | ........... F25B 49/025 |
| | | | 62/324.6 |
| 2020/0021232 A1* | 1/2020 | Iwazaki | ................ H02P 25/184 |
| 2020/0162009 A1* | 5/2020 | Hatakeyama | ....... H02P 29/0241 |
| 2020/0235691 A1* | 7/2020 | Shizu | ...................... H02P 27/06 |

* cited by examiner

ELECTRIC MOTOR DRIVE DEVICE

CROSS-REFERENCE TO RELATED APPLICATION

This application is a U.S. national stage application of International Patent Application No. PCT/JP2017/038358 filed on Oct. 24, 2017, the disclosure of which is incorporated herein by reference.

TECHNICAL FIELD

The present invention relates to an electric motor drive device that drives an electric motor configured to be capable of switching the wire connection state of the stator winding.

BACKGROUND

An air conditioner adjusts its cooling and heating capacity by controlling the rotational speed of the electric motor for the compressor. Air conditioners are required to improve energy-saving performance. In general, the energy-saving performance of a home-use air conditioner is calculated for each of the five conditions: cooling median, heating median, cooling rated, heating rated, and heating low temperature. Cooling median and heating median represent low load regions where the electric motor rotates at low speed, and cooling rated, heating rated, and heating low represent high load regions where the electric motor rotates at high speed. It is desirable that the efficiency of the electric motor be increased in a wide range of rotational speeds.

An example of an electric motor for the compressor of an air conditioner is an electric motor configured to be capable of switching the wire connection state of the stator winding. An electric motor drive device that drives the electric motor capable of switching the wire connection state of the stator winding can reduce power consumption and operate efficiently by switching the wire connection state of the stator winding to an appropriate state in accordance with a change in the load state of the electric motor (see, for example, Patent Literature 1).

The electric motor configured to be capable of switching the wire connection state of the stator winding is exemplified by an electric motor configured to be capable of switching between star connection and delta connection, an electric motor configured to be capable of switching between parallel connection and series connection, or the like.

For example, it is desirable that an electric motor for the compressor of an air conditioner be driven in a star connection state under low load conditions where the contribution to the annual power consumption is high, specifically, in the case of cooling median and heating median, and be driven in a delta connection state under high load conditions, specifically, in the case of cooling rated, heating rated, and heating low temperature. Consequently, the air conditioner can improve its efficiency in low load conditions and can also achieve high output in high load conditions.

Here, in an electric motor with permanent magnets, the magnets are demagnetized when the winding current, which is the current flowing through the stator winding, exceeds a predetermined allowable value. Therefore, an electric motor drive device that drives an electric motor with permanent magnets has a protection function for preventing the magnets from being demagnetized by keeping the winding current equal to or less than the allowable value. A typical control method that is used by an electric motor drive device that drives an electric motor with permanent magnets includes detecting the current flowing through the inverter, continuing the operation of the inverter if the detected current is equal to or less than a threshold value, and stopping the operation of the inverter if the detected current exceeds the threshold value.

In the case of detecting the current flowing through the inverter for comparison with the threshold value, since the ratio between the detected current and the winding current varies depending on the wire connection state, different threshold values should be used depending on the wire connection state. For example, in the star connection, the current output from the inverter and the winding current have the same magnitude, but in the delta connection, the current output from the inverter is $\sqrt{3}$ times the winding current. Therefore, in the case of controlling the inverter such that the current flowing through the inverter does not exceed the threshold value for the purpose of preventing demagnetization, the threshold value for the star connection needs to be $1/\sqrt{3}$ times the threshold value for the delta connection (see Patent Literature 1).

Patent Literature 1 describes an electric motor drive device including a comparison circuit having a configuration corresponding to the delta connection of the stator winding and a comparison circuit having a configuration corresponding to the star connection of the stator winding. In this electric motor drive device, a central processing unit (CPU) performs abnormality detection using a comparison result in the comparison circuit corresponding to the state of the stator winding (see paragraph 0042 and FIG. 14(b) of Patent Literature 1). Patent Literature 1 also describes an electric motor drive device including a circuit that generates a reference value to be used for comparison with the winding current when the stator winding is in the star connection and a reference value to be used for comparison with the winding current when the stator winding is in the delta connection. In this electric motor drive device, a CPU performs abnormality detection using a comparison result between the winding current and the reference value corresponding to the state of the stator winding (see paragraphs 0048 and 0070, FIG. 14(c), and FIG. 14(d) of Patent Literature 1).

Patent Literature

Patent Literature 1: Japanese Patent Application Laid-open No. 2008-228513

In the case of applying the configuration described in FIG. 14(b) of Patent Literature 1, a comparison result in each of the two comparison circuits is input to the CPU, and the CPU performs control using one of the two input comparison results corresponding to the wire connection state. Therefore, the CPU requires two input ports, which is a problem. On the other hand, in the circuit described in FIG. 14(c) and FIG. 14(d) of Patent Literature 1, one of the two resistors connected in series is short-circuited by a transistor, so that a two-level reference value corresponding to the two wire connection states is generated, and a comparison result between the generated reference value and the winding current is input to the CPU. Therefore, the CPU requires only one input port. However, the digital transistor has large variations in internal resistance, and it is necessary to set a constant in consideration of variations. That is, it is necessary to set a large difference between the reference value and the winding current at which the magnet demagnetization actually occurs. Therefore, the accuracy of the protection level, specifically, the accuracy of determination as to whether an excessive current is flowing through the stator winding, is reduced. This is problematic because the operation of the electric motor is restricted when no excessive current is actually flowing through the stator winding, and the electric motor cannot be operated to the limit of its capacity.

SUMMARY

The present invention has been made in view of the above, and an object thereof is to provide an electric motor drive device capable of enhancing the performance of the protection function for the electric motor while preventing an increase in the number of input ports required by the CPU to be used.

In order to solve the above-described problems and achieve the object, an aspect of the present invention provides an electric motor drive device for driving an electric motor capable of switching a wire connection state of a stator winding. The electric motor drive device includes: a wire connection switching unit to switch the wire connection state of the stator winding; an inverter to generate electric power to be supplied to the electric motor; a control device to control the wire connection switching unit and the inverter; and an overcurrent protection circuit to prevent a current exceeding a predetermined value from continuously flowing through the electric motor. The overcurrent protection circuit includes: a plurality of determination circuits each correlated one-to-one with any one of a plurality of possible wire connection states of the stator winding, the plurality of determination circuits being configured to determine whether a current flowing through the inverter has an abnormal value; a combining circuit to combine determination results in the plurality of determination circuits; and an invalidation circuit to invalidate a determination process by one or more of the plurality of determination circuits, and cause the combining circuit to output a determination result by the determination circuit correlated with a selected wire connection state of the stator winding. When the determination result output from the combining circuit indicates that the current flowing through the inverter has an abnormal value, the control device stops the inverter.

The electric motor drive device according to the present invention can achieve the effect of enhancing the performance of the protection function for the electric motor while preventing an increase in the number of input ports required by the CPU to be used.

DETAILED DESCRIPTION

Hereinafter, electric motor drive devices according to embodiments of the present invention will be described in detail based on the drawings. The present invention is not limited to the embodiments.

First Embodiment

Figure 1:
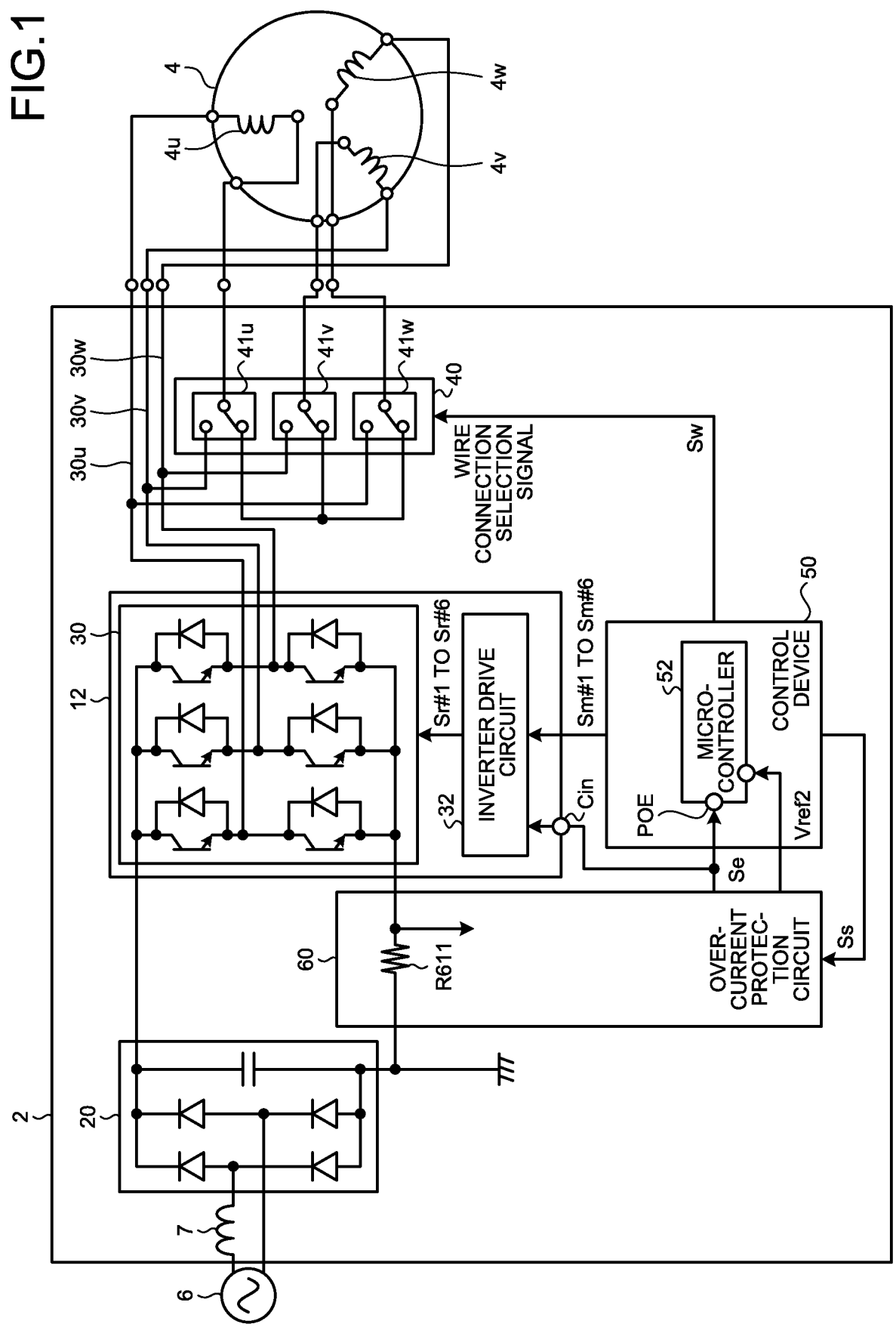
FIG. 1 is a schematic wiring diagram illustrating an example of an electric motor drive device according to a first embodiment.

FIG. 1 is a schematic wiring diagram illustrating an example of an electric motor drive device according to a first embodiment of the present invention. In FIG. 1, the electric motor that is driven by the electric motor drive device is also illustrated. An electric motor drive device 2 according to the first embodiment illustrated in FIG. 1 generates electric power for driving an electric motor 4.

As illustrated in FIG. 1, the electric motor drive device 2 includes a converter 20, an inverter 30, an inverter drive circuit 32, a wire connection switching unit 40, a control device 50, and an overcurrent protection circuit 60. The inverter 30 and the inverter drive circuit 32 are mounted on an intelligent power module (IPM) 12. An AC power supply 6 is connected to the input side of the converter 20, and the electric motor 4 is connected to the output side of the inverter 30. The electric motor 4 is a permanent magnet synchronous electric motor whose rotor includes a permanent magnet, and is driven by the supply of three-phase AC power from the inverter 30.

The converter 20 receives AC power from the AC power supply 6 through a reactor 7, performs rectification, smoothing, etc. on the AC power, and outputs DC power. The converter 20 acts as a DC power supply that supplies DC power to the inverter 30.

The input terminal of the inverter 30 is connected to the output terminal of the converter 20. The U-phase output terminal of the inverter 30 is connected to one end of a winding 4u of the electric motor 4 via a U-phase output line 30u. The V-phase output terminal of the inverter 30 is connected to one end of a winding 4v of the electric motor 4 via a V-phase output line 30v. The W-phase output terminal of the inverter 30 is connected to one end of a winding 4w of the electric motor 4 via a W-phase output line 30w.

The inverter 30 includes six arms each including a switching element. The inverter 30 generates and supplies three-phase AC power to the electric motor 4 by turning each switching element on and off. Specifically, the inverter 30 turns the switching elements of the six arms on or off according to the state of drive signals Sr #1 to Sr #6 corresponding to the respective arms input from the inverter drive circuit 32, and generates three-phase AC power for driving the electric motor 4. The drive signals Sr #1 to Sr #6 will be described later.

The overcurrent protection circuit 60 is provided between the converter 20 and the inverter 30. The overcurrent protection circuit 60 detects an excessive current flowing through the stator winding of the electric motor 4 on the basis of the current flowing through the inverter 30, and stops the excessive current from flowing through the stator winding of the electric motor 4. That is, in order to protect the electric motor 4, the overcurrent protection circuit 60 prevents the permanent magnet constituting the rotor from being demagnetized by a continuous flow of an excessive current exceeding a predetermined value through the stator winding of the electric motor 4.

The inverter drive circuit 32 generates the above-mentioned drive signals Sr #1 to Sr #6 to be input to the inverter 30 on the basis of control signals input from the control device 50 (described later), specifically, control signals Sm #1 to Sm #6 each indicating the state of the switching element of the corresponding arm of the inverter 30. The control signals Sm #1 to Sm #6 are on/off control signals for on/off control of the switching elements of the respective arms of the inverter 30. The drive signals Sr #1 to Sr #6 generated by the inverter drive circuit 32 are, for example, pulse width modulation (PWM) signals.

The electric motor 4 is configured to be operable in any of a plurality of wire connection states of the stator winding. Switching between the wire connection states is performed by the electric motor drive device 2. The electric motor 4 illustrated in FIG. 1 is operated while the stator winding is in a delta connection state or a star connection state. In the following examples, the plurality of wire connection states are the star connection state and the delta connection state.

Figure 2:
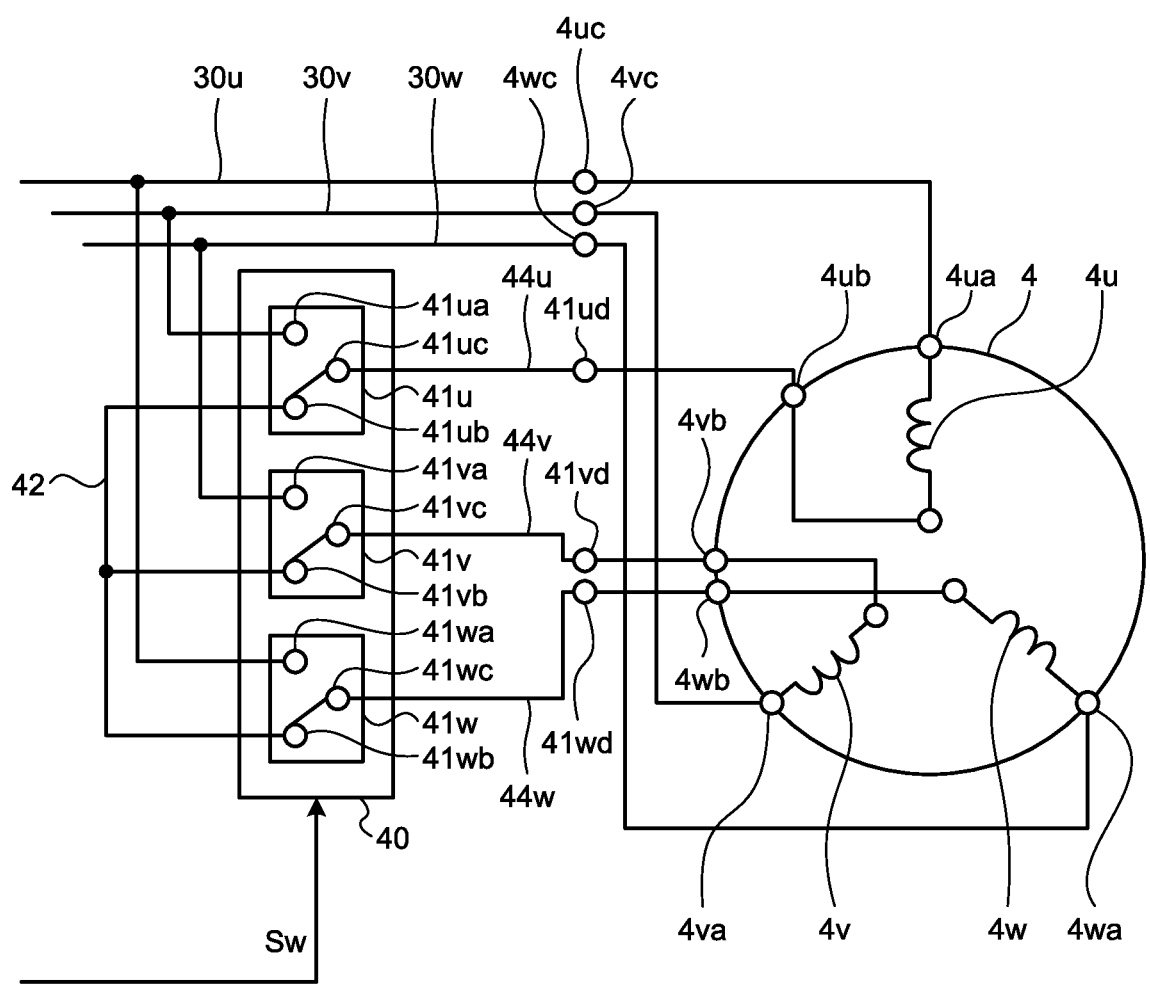
FIG. 2 is a wiring diagram illustrating an exemplary connection relationship between a wire connection switching unit of the electric motor drive device and each winding of an electric motor according to the first embodiment.

In a case where the electric motor 4 is operable in either the star connection state or the delta connection state, the wire connection switching unit 40 of the electric motor drive device 2 is configured to be capable of switching to either the star connection or the delta connection. That is, the wire connection switching unit 40 switches the state of the stator winding of the electric motor 4 between the star connection and the delta connection. The configuration of the wire connection switching unit 40 and the connection relationship between each winding of the electric motor 4 and the wire connection switching unit 40 will be described in detail with reference to FIG. 2. FIG. 2 is a wiring diagram illustrating an exemplary connection relationship between the wire connection switching unit 40 of the electric motor drive device 2 and each winding of the electric motor 4 according to the first embodiment.

As illustrated in FIG. 2, the electric motor 4 includes the windings 4u, 4v, and 4w of three phases, that is, the U phase, the V phase, and the W phase, respectively. First ends 4ua, 4va, and 4wa of the windings 4u, 4v, and 4w are respectively connected to external terminals 4uc, 4vc, and 4wc, and second ends 4ub, 4vb, and 4wb of the windings 4u, 4v, and 4w are respectively connected to external terminals 41ud, 41vd, and 41wd, so that the electric motor 4 can be connected to an external device. The output lines 30u, 30v, and 30w of the inverter 30 are connected to the external terminals 4uc, 4vc, and 4wc, respectively.

The wire connection switching unit 40 includes three changeover switches 41u, 41v, and 41w. The three changeover switches 41u, 41v, and 41w correspond to the three phases.

As the changeover switches 41u, 41v, and 41w, electromagnetically driven mechanical switches are used. Such switches are called relays, contactors, or the like, and take different states depending on whether a current flows through exciting coils (not illustrated) or not.

The changeover switch 41u includes a normally open contact 41ua, a normally closed contact 41ub, and a common contact 41uc. The common contact 41uc of the changeover switch 41u is connected to the external terminal 41ud via a lead wire 44u, and the normally closed contact 41ub is connected to a neutral point node 42. The normally open contact 41ua is connected to the V-phase output line 30v of the inverter 30.

The changeover switch 41v includes a normally open contact 41va, a normally closed contact 41vb, and a common contact 41vc. The common contact 41vc of the changeover switch 41v is connected to the external terminal 41vd via a lead wire 44v, and the normally closed contact 41vb is connected to the neutral point node 42. The normally open contact 41va is connected to the W-phase output line 30w of the inverter 30.

The changeover switch 41w includes a normally open contact 41wa, a normally closed contact 41wb, and a common contact 41wc. The common contact 41wc of the changeover switch 41w is connected to the external terminal 41wd via a lead wire 44w, and the normally closed contact 41wb is connected to the neutral point node 42. The normally open contact 41wa is connected to the U-phase output line 30u of the inverter 30.

The changeover switches 41u, 41v, and 41w are normally in the state illustrated in FIG. 2. The normal state is a state in which no current flows through the above-described exciting coils (not illustrated). Therefore, normally, the changeover switches 41u, 41v, and 41w are switched to the normally closed contact side, that is, the common contacts 41uc, 41vc, and 41wc are connected to the normally closed contacts 41ub, 41vb, and 41wb, respectively. In this case, the state of the stator winding of the electric motor 4 is the star connection. When a current flows through the exciting coil of each of the changeover switches 41u, 41v, and 41w, the changeover switches 41u, 41v, and 41w are put into the state opposite to the state illustrated in FIG. 2, that is, the common contacts 41uc, 41vc, and 41wc are connected to the normally open contacts 41*ua*, 41*va*, and 41*wa*, respectively. In this case, the state of the stator winding of the electric motor 4 is the delta connection.

The state of the changeover switches 41*u*, 41*v*, and 41*w* of the wire connection switching unit 40 is controlled by the control device 50. The changeover switches 41*u*, 41*v*, and 41*w* are configured such that the common contacts (41*uc*, 41*vc*, and 41*wc*) are connected to the normally closed contacts (41*ub*, 41*vb*, and 41*wb*) when a wire connection selection signal Sw generated by the control device 50 indicates the star connection. Moreover, the changeover switches 41*u*, 41*v*, and 41*w* are configured such that the common contacts (41*uc*, 41*vc*, and 41*wc*) are connected to the normally open contacts (41*ua*, 41*va*, and 41*wa*) when the wire connection selection signal Sw generated by the control device 50 indicates the delta connection.

The control device 50 controls the wire connection switching unit 40 such that the wire connection state of the stator winding of the electric motor 4 is switched, and controls the inverter 30 to be turned on/off to cause the inverter 30 to supply AC power to the electric motor 4. The control device 50 generates the control signals Sm #1 to Sm #6, supplies the control signals Sm #1 to Sm #6 to the inverter drive circuit 32, and causes the inverter drive circuit 32 to generate the drive signals Sr #1 to Sr #6 corresponding to the control signals Sm #1 to Sm #6, thereby controlling each switching element of the inverter 30.

Hereinafter, an example in which the control device 50 performs PWM control of the inverter 30 will be described. For performing PWM control of the inverter 30, the control device 50 supplies PWM signals as the control signals Sm #1 to Sm #6 to the inverter drive circuit 32. In this case, the inverter 30 can generate three-phase AC power with variable frequency and voltage. Another example of the on/off control that the control device 50 performs on the inverter 30 is rectangular wave drive control. For performing rectangular wave drive control, for example, the control device 50 generates control signals for energizing the winding of each phase for 120 degrees and supplies the control signals to the inverter drive circuit 32. In this case, the inverter 30 can generate three-phase AC power with variable frequency.

Figure 3:
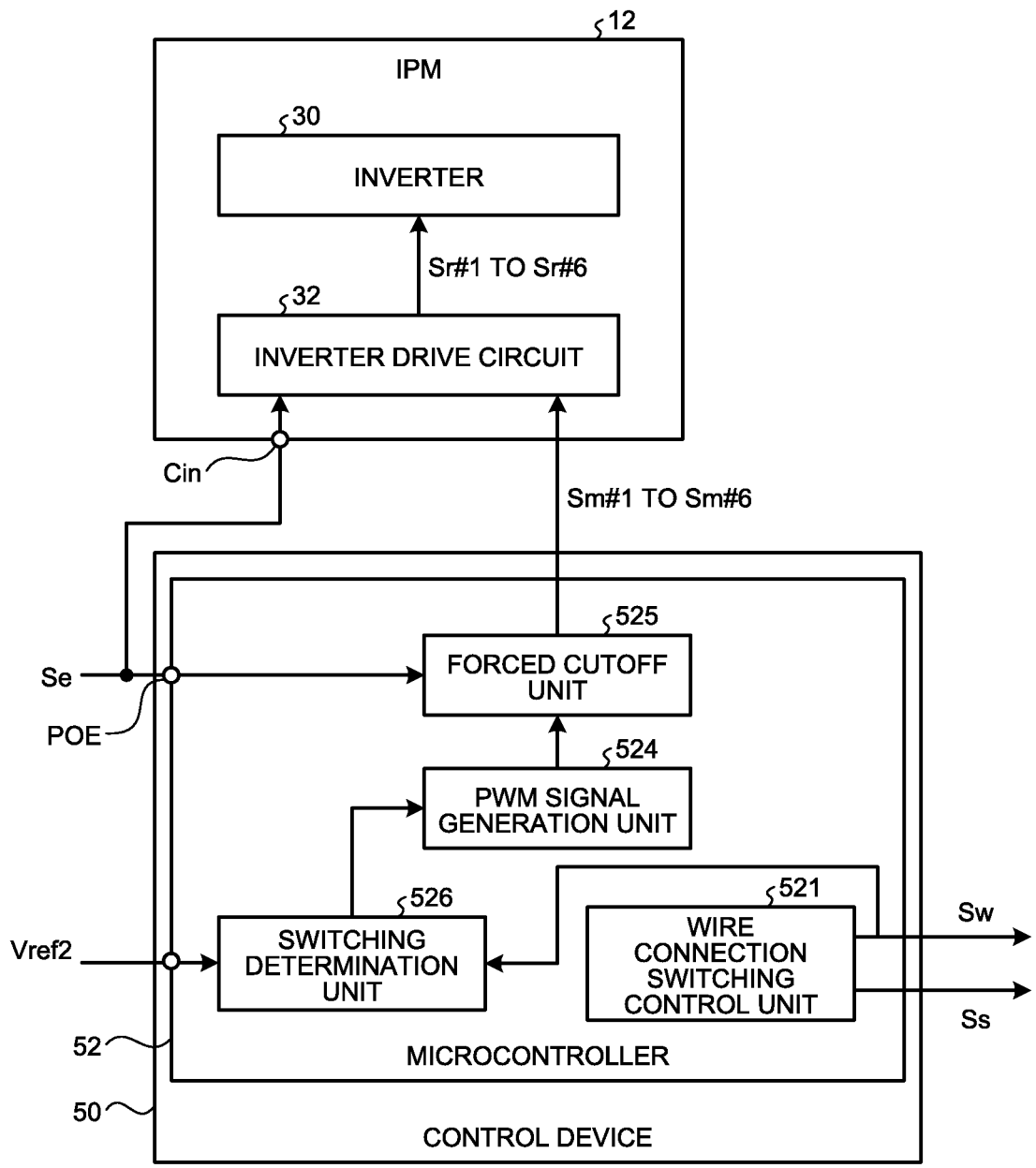
FIG. 3 is a block diagram illustrating an exemplary schematic configuration of a control device according to the first embodiment.

The control device 50 includes a microcontroller 52 as illustrated in FIGS. 1 and 3. The microcontroller 52 includes a CPU and a memory. FIG. 3 is a diagram illustrating an exemplary configuration of the control device 50. As illustrated in FIG. 3, the control device 50 includes a wire connection switching control unit 521, a PWM signal generation unit 524, a forced cutoff unit 525, and a switching determination unit 526, which are implemented by the microcontroller 52. The wire connection switching control unit 521, the PWM signal generation unit 524, and the switching determination unit 526 other than the forced cutoff unit 525 are implemented by the CPU in the microcontroller 52 executing a program for operating as each of these functional units.

The wire connection switching control unit 521 generates the wire connection selection signal Sw. This wire connection selection signal Sw is a control signal for designating whether the stator winding of the electric motor 4 should be the star connection or the delta connection. The wire connection switching control unit 521 controls the wire connection state of the stator winding of the electric motor 4 such that the star connection is selected when the operation frequency of the electric motor 4 is equal to or lower than a predetermined frequency and the delta connection is selected when the operation frequency of the electric motor 4 is higher than the predetermined frequency. For example, the wire connection switching control unit 521 generates the wire connection selection signal Sw that becomes low when the star connection is designated and becomes high when the delta connection is designated. The operation frequency of the electric motor 4 is computed using the detection value of the current of each phase flowing from the inverter 30 to the electric motor 4, the voltage of each phase output from the inverter 30, the frequency command input from the outside of the electric motor drive device 2, and the like. The operation frequency of the electric motor 4 may be computed by the wire connection switching control unit 521, or computed by another processing unit (not illustrated) and input to the wire connection switching control unit 521. In FIG. 3, input signals to the wire connection switching control unit 521 are not illustrated.

The wire connection selection signal Sw is supplied to the wire connection switching unit 40 and used to control the state of the changeover switches 41*u*, 41*v*, and 41*w*. In the configuration where the wire connection switching control unit 521 generates the wire connection selection signal Sw that becomes the low level when designating the star connection and becomes the high level when designating the delta connection, when the wire connection selection signal Sw indicates the low level, the changeover switches 41*u*, 41*v*, and 41*w* are put into the state illustrated in FIG. 2, that is, the state in which the common contacts are connected to the normally closed contacts. When the wire connection selection signal Sw is at the high level, the changeover switches 41*u*, 41*v*, and 41*w* are put into the state opposite to the state illustrated in FIG. 2, that is, the state in which the common contacts are connected to the normally open contacts.

The wire connection switching control unit 521 further supplies an inverted wire connection selection signal Ss to the overcurrent protection circuit 60. The logical value of the inverted wire connection selection signal Ss is opposite to that of the wire connection selection signal Sw. That is, the inverted wire connection selection signal Ss becomes high when the wire connection selection signal Sw is low, and becomes low when the wire connection selection signal Sw is high.

The PWM signal generation unit 524 outputs the control signals Sm #1 to Sm #6 for PWM control of the inverter 30. Hereinafter, the control signals Sm #1 to Sm #6 are referred to as the PWM signals Sm #1 to Sm #6. The PWM signals Sm #1 to Sm #6 are used for on/off control of the respective switching elements of the six arms of the inverter 30. Each of the PWM signals Sm #1 to Sm #6 is maintained in the high state during a period in which the corresponding switching element is to be maintained in the on state, and is maintained in the low state during a period in which the corresponding switching element is to be maintained in the off state. The PWM signals Sm #1 to Sm #6 generated by the PWM signal generation unit 524 are supplied to the inverter drive circuit 32 via the forced cutoff unit 525.

As described above, the inverter drive circuit 32 generates and outputs the drive signals Sr #1 to Sr #6 for turning on or off the switching elements of the six arms of the inverter 30 on the basis of the PWM signals Sm #1 to Sm #6. However, the inverter drive circuit 32 is connected to an overcurrent cutoff port Cin of the IPM 12, and in response to a high-level signal being input to the overcurrent cutoff port Cin, generates signals for turning off the switching elements of all the arms of the inverter 30 and outputs the signals as the drive signals Sr #1 to Sr #6, regardless of the state of the PWM signals Sm #1 to Sm #6.

The drive signals Sr #1 to Sr #6 are generated corresponding to the PWM signals Sm #1 to Sm #6, respectively. Each of the drive signals Sr #1 to Sr #6 controls the state of the corresponding switching element such that the corresponding switching element is maintained in the on state while the corresponding PWM signal is high and the corresponding switching element is maintained in the off state while the corresponding PWM signal is low. The magnitude of the PWM signals Sm #1 to Sm #6 is equivalent to the signal level of the logic circuit, specifically within the range of 0 to 5 V. On the other hand, the magnitude of the drive signals Sr #1 to Sr #6 is equivalent to the voltage level required to control the switching elements, for example, 15 V in the high state.

The forced cutoff unit 525 outputs the PWM signals Sm #1 to Sm #6 input from the PWM signal generation unit 524 to the inverter drive circuit 32 as they are when the value of the current flowing through the electric motor 4 is normal. On the other hand, when the value of the current flowing through the electric motor 4 is abnormal, specifically, when the value of the current exceeds a predetermined reference value, the forced cutoff unit 525 does not output the PWM signals Sm #1 to Sm #6 input from the PWM signal generation unit 524 to the inverter drive circuit 32.

The forced cutoff unit 525 is connected to a port POE that is the operation cutoff port of the microcontroller 52. An input signal to the port POE is an overcurrent detection signal Se that is at the low level when the value of the current flowing through the electric motor 4 is normal and is at the high level when the value of the current flowing through the electric motor 4 is abnormal. Details of the overcurrent detection signal Se input to the port POE will be described later. When the input signal to the port POE becomes the high level, the forced cutoff unit 525 stops the output of the PWM signals Sm #1 to Sm #6 input from the PWM signal generation unit 524 to the inverter drive circuit 32. When the supply of the PWM signals Sm #1 to Sm #6 is stopped, the inverter drive circuit 32 generates signals for turning off the switching elements of all the arms of the inverter 30 and outputs the signals as the drive signals Sr #1 to Sr #6. As a result, the switching elements of all the arms of the inverter 30 are turned off. After the switching elements of all the arms are turned off, the inverter 30 is stopped, and the output of AC power is stopped.

The forced cutoff unit 525 is configured with hardware that operates independently of the control program executed by the microcontroller 52. The process of stopping the output of the PWM signals Sm #1 to Sm #6 generated by the PWM signal generation unit 524 according to the state of the signal input to the operation cutoff port (port POE) is performed by the forced cutoff unit 525 configured with hardware and does not involve processing by software of the microcontroller 52. Therefore, this process is performed at high speed. For example, the forced cutoff unit 525 is implemented by inserting, into each of the signal lines that transmit the PWM signals Sm #1 to Sm #6, a switch that is kept closed while the input signal to the port POE is at the low level and is opened when the input signal to the port POE is at the high level.

The switching determination unit 526 determines whether the reference value for the process of detecting that an overcurrent is flowing through the stator winding of the electric motor 4 has been normally switched to a value corresponding to the wire connection state of the stator winding on the basis of the wire connection selection signal Sw and a reference value Vref2 of two reference values Vref1 and Vref2 generated by the overcurrent protection circuit 60 (described later). That is, the switching determination unit 526 determines whether the correct protection operation is performed using the correct reference value corresponding to the wire connection state of the stator winding of the electric motor 4 by the overcurrent protection circuit 60 that determines whether an overcurrent is flowing through the stator winding.

When the reference value Vref2 is a value that does not correspond to the wire connection state of the stator winding indicated by the wire connection selection signal Sw, the switching determination unit 526 instructs the PWM signal generation unit 524 to stop outputting the PWM signals. Then, the output of the PWM signals Sm #1 to Sm #6 from the PWM signal generation unit 524 is stopped. When the supply of the PWM signals Sm #1 to Sm #6 is stopped, the inverter drive circuit 32 turns off the switching elements of all the arms of the inverter 30. After the switching elements are turned off, the inverter 30 is stopped, and the output of AC power is stopped. In response to receiving an instruction to stop the output of the PWM signals from the switching determination unit 526, the PWM signal generation unit 524 may set all the PWM signals Sm #1 to Sm #6 to the low level to turn off the switching elements of all the arms of the inverter 30.

The reason why the control device 50 doubly performs the process for stopping the inverter 30 as described above is to control the operation of the inverter 30 at higher speed and more reliably when an abnormality occurs.

Figure 4:
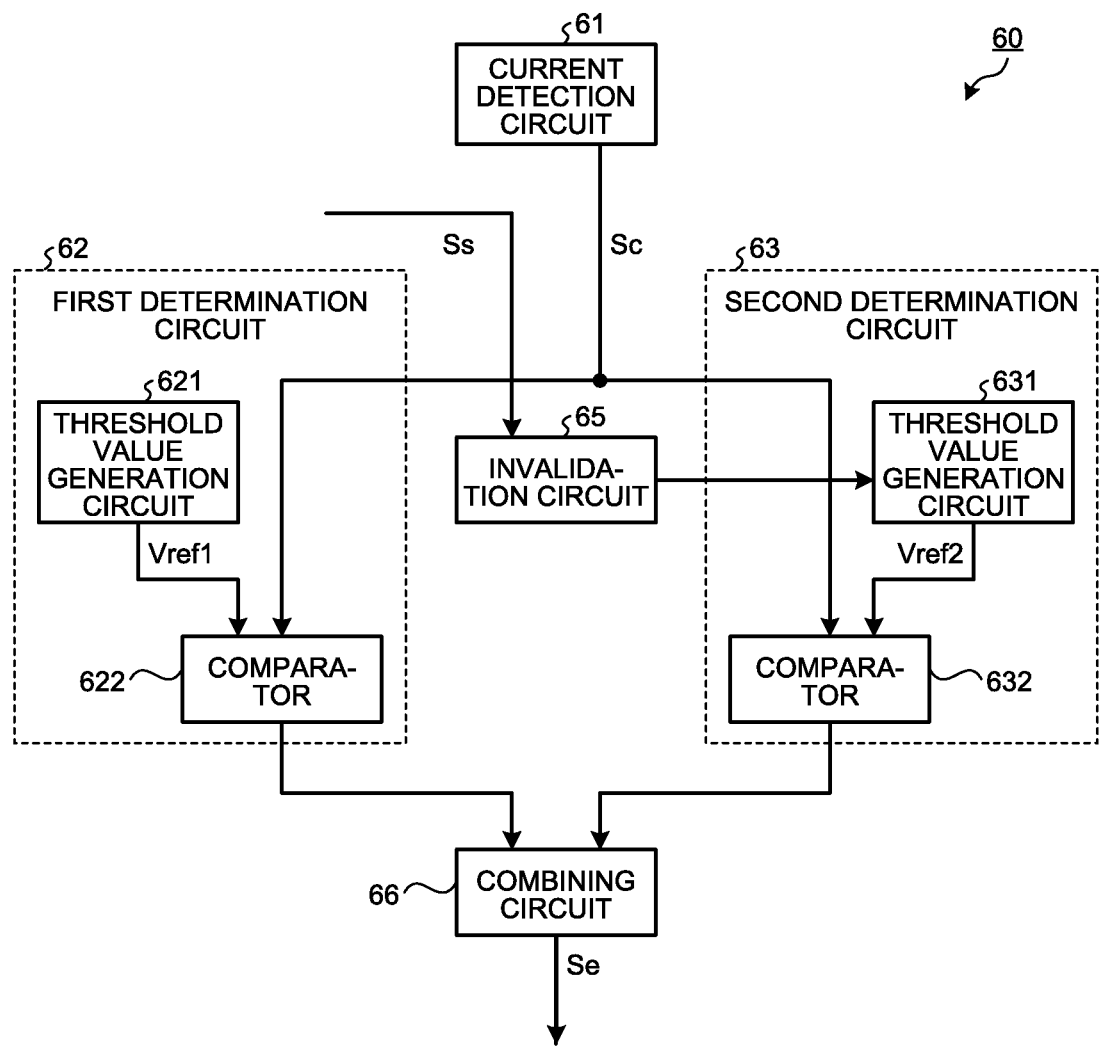
FIG. 4 is a block diagram illustrating an exemplary schematic configuration of an overcurrent protection circuit according to the first embodiment.
Figure 5:
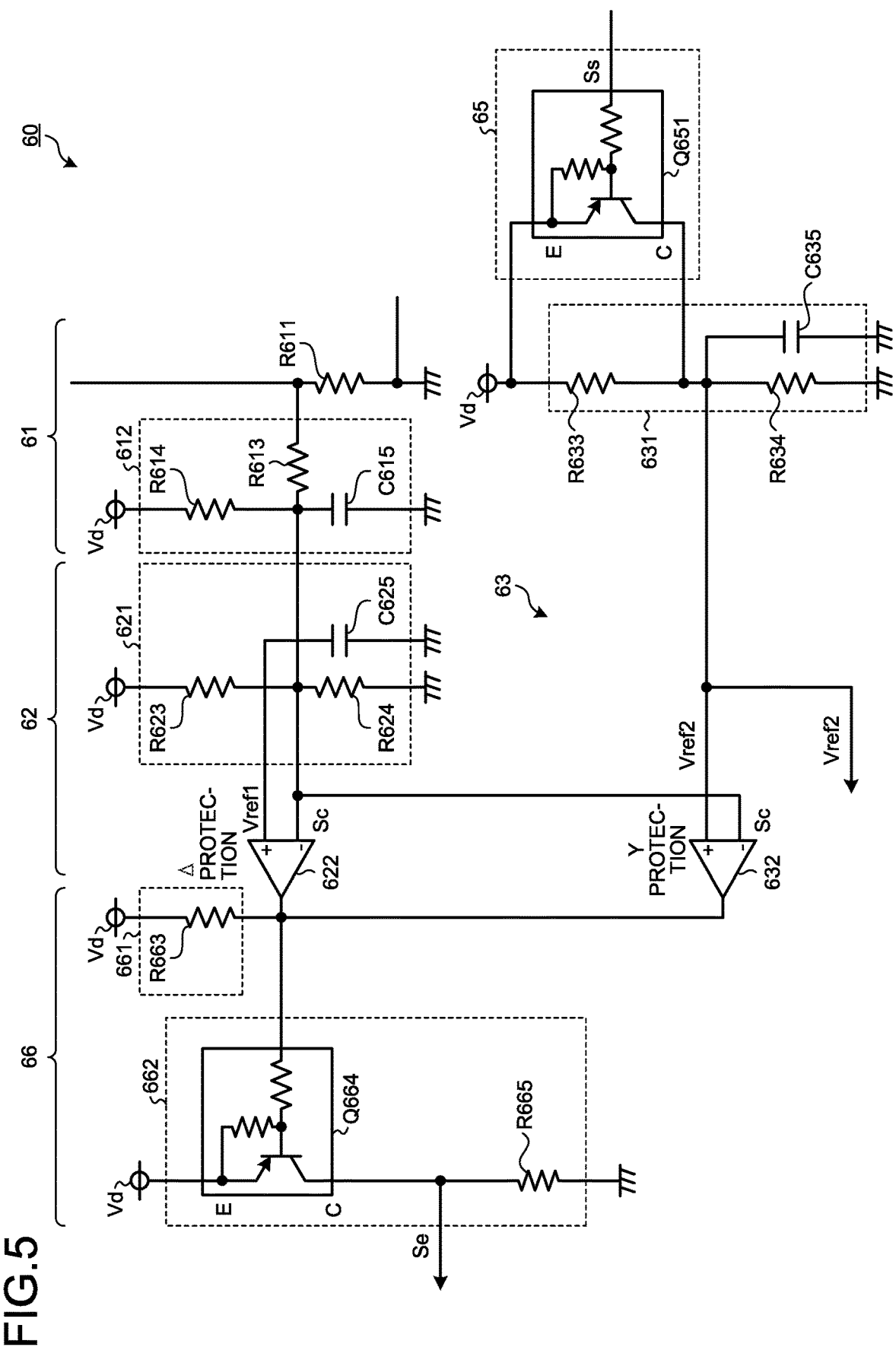
FIG. 5 is a wiring diagram illustrating an example of the overcurrent protection circuit according to the first embodiment.

Next, the overcurrent protection circuit 60 will be described with reference to FIGS. 4 and 5. FIG. 4 is a block diagram illustrating an exemplary schematic configuration of the overcurrent protection circuit 60 according to the first embodiment. FIG. 5 is a wiring diagram illustrating an example of the overcurrent protection circuit 60 according to the first embodiment.

As illustrated in FIG. 4, the overcurrent protection circuit 60 includes a current detection circuit 61, a first determination circuit 62, a second determination circuit 63, an invalidation circuit 65, and a combining circuit 66. The first determination circuit 62 includes a threshold value generation circuit 621 and a comparator 622, and the second determination circuit 63 includes a threshold value generation circuit 631 and a comparator 632. The comparators 622 and 632 are configured with operational amplifiers, for example.

(Current Detection Circuit 61)

The current detection circuit 61 detects a current flowing through the DC bus connecting the converter 20 and the inverter 30 illustrated in FIG. 1, and outputs a current value signal Sc indicating the detection result to the comparator 622 of the first determination circuit 62 and the comparator 632 of the second determination circuit 63.

The current detection circuit 61 includes a resistor R611 and a smoothing circuit 612 illustrated in FIG. 5.

The resistor R611 is inserted into the bus connecting the output terminal of the converter 20 and the input terminal of the inverter 30. The first end of the resistor R611 is connected to the ground.

As illustrated in FIG. 5, the smoothing circuit 612 includes resistors R613 and R614 and a capacitor C615. The first end of the resistor R613 is connected to the second end of the resistor R611. The first end of the resistor R614 is connected to a control power supply that outputs a control voltage Vd, and the second end of the resistor R614 is connected to the second end of the resistor R613. The first terminal of the capacitor C615 is connected to the second end of the resistor R613, and the second terminal of the capacitor C615 is connected to the ground.

In the current detection circuit 61, a voltage obtained by smoothing the voltage across the resistor R611 appears between the two terminals of the capacitor C615, and the voltage between the two terminals of the capacitor C615 is supplied as the current value signal Sc that is a signal indicating a current detection value to the comparator 622 of the first determination circuit 62 and the comparator 632 of the second determination circuit 63.

(First Determination Circuit 62)

The first determination circuit 62 determines whether an excessive current is flowing through the stator winding of the electric motor 4 illustrated in FIG. 1 when the stator winding is in the delta connection, and outputs the determination result to the combining circuit 66.

The threshold value generation circuit 621 of the first determination circuit 62 includes resistors R623 and R624 and a smoothing capacitor C625 illustrated in FIG. 5. The resistors R623 and R624 are connected in series to form a voltage dividing circuit.

The first end of the resistor R623 is connected to a control power supply that outputs a control voltage Vd, the first end of the resistor R624 is connected to the second end of the resistor R623, and the second end of the resistor R624 is connected to the ground. The capacitor C625 is connected in parallel with the resistor R624.

In the threshold value generation circuit 621, the control voltage Vd output from the control power supply is divided by the voltage dividing circuit including the resistors R623 and R624, and a voltage VtΔ corresponding to the voltage dividing ratio of the voltage dividing circuit appears at the connection point between the resistor R623 and the resistor R624, that is, at the voltage dividing node of the voltage dividing circuit. The voltage VtΔ is a threshold value for delta connection. The voltage VtΔ is input to the positive terminal, i.e. the non-inverting input terminal, of the comparator 622 as the reference value Vref1 that is the first reference value. The threshold value for delta connection is the first threshold value. The voltage VtΔ appearing at the connection point between the resistor R623 and the resistor R624 is expressed by Formula (1) below.

$$VtΔ = Vd \times R624/(R623+R624) \qquad (1)$$

In Formula (1), "Rxxx" represents a resistance value. For example, "R624" in Formula (1) represents the resistance value of the resistor R624. The same applies to Formula (2) and the subsequent formulas described later.

The current value signal Sc is input from the current detection circuit 61 to the negative terminal, i.e. the inverting input terminal, of the comparator 622. The comparator 622 compares the current value signal Sc with the reference value Vref1. If the current value signal Sc is larger than the reference value Vref1, the comparator 622 outputs a low-level signal to the combining circuit 66. If the current value signal Sc is equal to or lower than the reference value Vref1, the comparator 622 outputs a high-level signal to the combining circuit 66. The signal output from the comparator 622 to the combining circuit 66 is a signal indicating the determination result by the first determination circuit 62.

(Second Determination Circuit 63)

The second determination circuit 63 determines whether an excessive current is flowing through the stator winding of the electric motor 4 illustrated in FIG. 1 when the stator winding is in the star connection, and outputs the determination result to the combining circuit 66.

The threshold value generation circuit 631 of the second determination circuit 63 includes resistors R633 and R634 and a smoothing capacitor C635 illustrated in FIG. 5. The resistors R633 and R634 are connected in series to form a voltage dividing circuit.

The first end of the resistor R633 is connected to a control power supply that outputs a control voltage Vd, the first end of the resistor R634 is connected to the second end of the resistor R633, and the second end of the resistor R634 is connected to the ground. The capacitor C635 is connected in parallel with the resistor R634.

In the threshold value generation circuit 631, the control voltage Vd output from the control power supply is divided by the voltage dividing circuit including the resistors R633 and R634, and a voltage VtY corresponding to the voltage dividing ratio of the voltage dividing circuit appears at the connection point between the resistor R633 and the resistor R634, that is, at the voltage dividing node of the voltage dividing circuit. The voltage VtY is a threshold value for star connection. The voltage VtY is input to the positive terminal, i.e. the non-inverting input terminal, of the comparator 632 as the reference value Vref2 that is the second reference value. The threshold value for star connection is the second threshold value. The voltage VtY appearing at the connection point between the resistor R633 and the resistor R634 is expressed by Formula (2) below.

$$VtY = Vd \times R634/(R633+R634) \qquad (2)$$

The current value signal Sc is input from the current detection circuit 61 to the negative terminal, i.e. the inverting input terminal, of the comparator 632. The comparator 632 compares the current value signal Sc with the reference value Vref2. If the current value signal Sc is larger than the reference value Vref2, the comparator 632 outputs a low-level signal to the combining circuit 66. If the current value signal Sc is equal to or lower than the reference value Vref2, the comparator 632 outputs a high-level signal to the combining circuit 66. The signal output from the comparator 632 to the combining circuit 66 is a signal indicating the determination result by the second determination circuit 63.

Here, the relationship between VtΔ and VtY mentioned above will be described. VtΔ and VtY satisfy the relationship of Formula (3) below.

$$VtΔ = \sqrt{3} \times VtY \qquad (3)$$

That is, the resistance values of the respective resistors R623, R624, R633, and R634 are determined so as to satisfy Formula (3).

Note that the configuration may be such that VtΔ is smaller than √3 times VtY. Here, VtΔ is larger than VtY. That is, the resistance values of the resistors R623, R624, R633, and R634 may be set so as to satisfy "VtY<VtΔ<√3× VtY". This is because, for example, in the delta connection, the winding current is a circulating current that flows through the stator winding of each phase, but the winding current does not contribute to the inverter current that flows through the inverter 30, that is, the current detected by the current detection circuit 61.

(Invalidation Circuit 65)

The invalidation circuit 65 invalidates the determination result in the second determination circuit 63 when the above-described inverted wire connection selection signal Ss is at the high level. The invalidation circuit 65 includes an npn-type digital transistor Q651 illustrated in FIG. 5. The emitter and collector of the digital transistor Q651 are connected to the two ends of the resistor R633 constituting the threshold value generation circuit 631 of the second determination circuit 63, that is, the first and second ends of the resistor R633, respectively.

The inverted wire connection selection signal Ss output from the control device 50 is input to the base of the digital transistor Q651. The digital transistor Q651 is turned off when the inverted wire connection selection signal Ss is at the high level, that is, when the stator winding of the electric motor 4 is in the star connection. The digital transistor Q651 is turned on when the inverted wire connection selection signal Ss is at the low level, that is, when the stator winding of the electric motor 4 is in the delta connection.

When the digital transistor Q651 is off, the threshold value generation circuit 631 of the second determination circuit 63 generates the threshold value VtY expressed by Formula (2) above for input as the reference value Vref2 to the positive terminal of the comparator 632.

On the other hand, when the digital transistor Q651 is on, the resistor R633 is short-circuited by the digital transistor Q651. Therefore, the threshold value generation circuit 631 generates a potential close to the control voltage Vd, specifically, the voltage lower than the control voltage Vd by an amount equivalent to the amount of voltage drop between the emitter and the collector in the on time of the digital transistor Q651. In this case, Vp=Vd−Von is satisfied, where Von represents the amount of voltage drop between the emitter and the collector in the on state of the digital transistor Q651, and Vp represents the voltage generated by the threshold value generation circuit 631 at this time. That is, when the digital transistor Q651 is turned on, the threshold value generation circuit 631 generates Vp=Vd−Von instead of the threshold value VtY expressed by Formula (2) above, and this Vp is input as the reference value Vref2 to the positive terminal of the comparator 632. In this case, the comparator 632 compares Vp=Vd−Von input through the positive terminal and the current value signal Sc input through the negative terminal, and outputs the comparison result to the combining circuit 66.

As described above, the threshold value VtY is used as the reference value Vref2 when the digital transistor Q651 is off, and Vp=Vd−Von is used as the reference value Vref2 when the digital transistor Q651 is on.

The reference value Vref2 output by the threshold value generation circuit 631 is also input to the switching determination unit 526 of the control device 50 illustrated in FIG. 3, and used for the determination process in the switching determination unit 526. The determination process performed by the switching determination unit 526 is, as described above, the process of determining whether the correct reference value corresponding to the wire connection state of the stator winding of the electric motor 4 is used in the overcurrent protection circuit 60 that determines whether an overcurrent is flowing through the stator winding.

(Combining Circuit 66)

The combining circuit 66 combines the determination result in the first determination circuit 62 and the determination result in the second determination circuit 63 to generate the overcurrent detection signal Se.

The combining circuit 66 includes a wired OR circuit 661 and an inverting circuit 662 illustrated in FIG. 5.

The wired OR circuit 661 includes a resistor R663. The first end of the resistor R633 is connected to a control power supply that outputs a control voltage Vd, and the second end of the resistor R633 is connected to the output terminal of the comparator 622 and the output terminal of the comparator 632.

When at least one of the output signal from the comparator 622 and the output signal from the comparator 632 is at the low level, the wired OR circuit 661 sets the input to the inverting circuit 662 to the low level. When both the output signal from the comparator 622 and the output signal from the comparator 632 are at the high level, the wired OR circuit 661 sets the input to the inverting circuit 662 to the high level. Note that the output part of the wired OR circuit 661 is the second end of the resistor R633.

The inverting circuit 662 includes a digital transistor Q664 and a resistor R665. The emitter terminal of the digital transistor Q664 is connected to a control power supply that outputs a control voltage Vd, and the base terminal of the digital transistor Q664 is connected to the second end of the resistor R663, namely the output part of the wired OR circuit 661. The collector terminal of the digital transistor Q664 is connected to the first end of the resistor R665. The second end of the resistor R665 is connected to the ground.

A signal obtained by inverting the logic state of the signal input from the wired OR circuit 661 to the base terminal appears at the collector terminal of the digital transistor Q664, and this signal is the overcurrent detection signal Se.

The overcurrent detection signal Se that is the output from the overcurrent protection circuit 60 is input to the overcurrent cutoff port Cin of the IPM 12 and the operation cutoff port (port POE) of the microcontroller 52, as illustrated in FIGS. 1 and 3.

When the overcurrent detection signal Se input to the overcurrent cutoff port Cin of the IPM 12 becomes the high level, the inverter drive circuit 32 puts all the drive signals Sr #1 to Sr #6 into the low state for output to the inverter 30, and turns off the switching elements of all the arms of the inverter 30.

When the overcurrent detection signal Se input to the operation cutoff port (port POE) of the microcontroller 52 becomes the high level, the forced cutoff unit 525 of the control device 50 stops the output of the PWM signals Sm #1 to Sm #6 generated by the PWM signal generation unit 524 to the inverter drive circuit 32. As a result, the supply of the PWM signals to the inverter drive circuit 32 is stopped, and the inverter drive circuit 32 turns off the switching elements of all the arms of the inverter 30.

As described above, in the electric motor drive device 2 according to the present embodiment, when the overcurrent detection signal Se output from the overcurrent protection circuit 60 becomes the high level, the process of stopping the inverter 30 is doubly performed.

Hereinafter, the operation of the first determination circuit 62, the second determination circuit 63, and the combining circuit 66 of the overcurrent protection circuit 60 will be described with reference to FIG. 6.

Figure 6A:
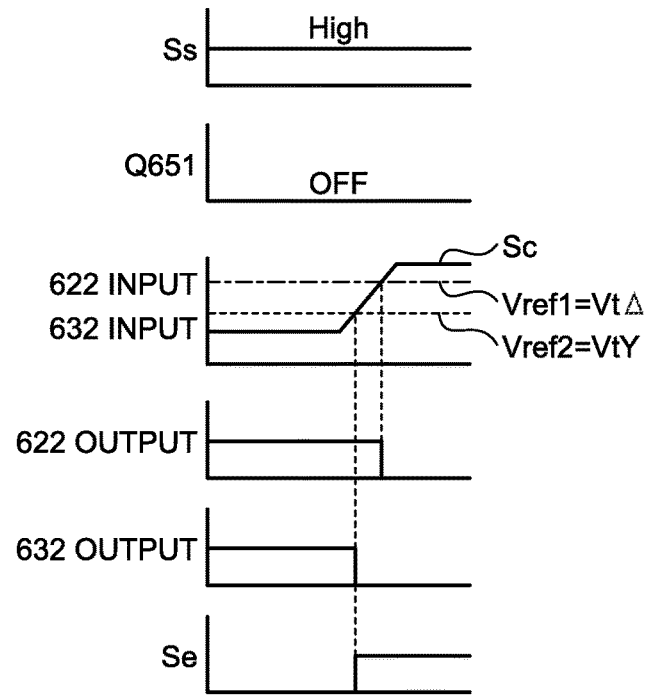
FIG. 6 is a time chart illustrating an example of the operation of the overcurrent protection circuit according to the first embodiment.
Figure 6B:
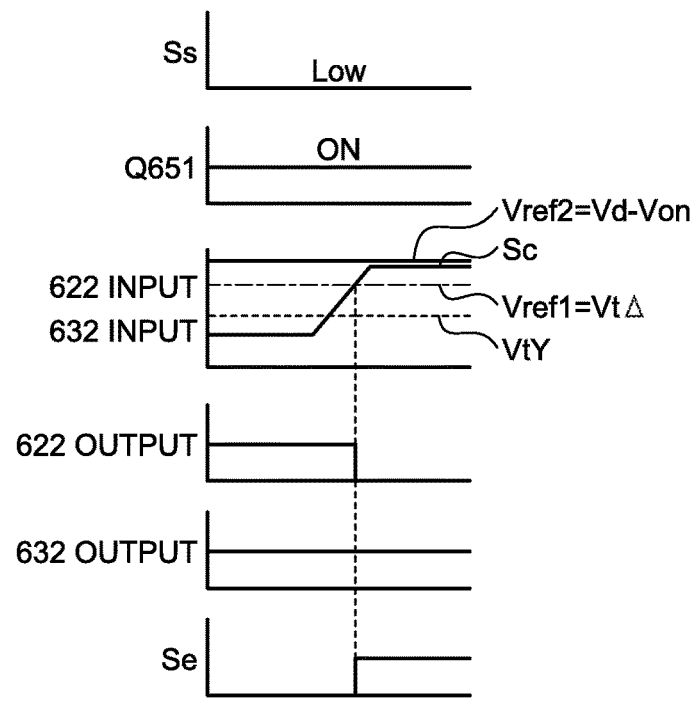

The inverted wire connection selection signal Ss that is supplied to the base of the digital transistor Q651, namely the invalidation circuit 65, is output from the wire connection switching control unit 521 of the control device 50 as described above. When the stator winding of the electric motor 4 is in the star connection, the inverted wire connection selection signal Ss becomes the high level as illustrated in FIG. 6A. When the stator winding of the electric motor 4 is in the delta connection, the inverted wire connection selection signal Ss becomes the low level as illustrated in FIG. 6B. Therefore, the digital transistor Q651 is turned off as illustrated in FIG. 6A when the stator winding of the electric motor 4 is in the star connection, and is turned on as illustrated in FIG. 6B when the stator winding of the electric motor 4 is in the delta connection.

Therefore, when the stator winding of the electric motor 4 is in the star connection, VtY described above is input as the reference value Vref2 to the positive terminal of the comparator 632 constituting the second determination circuit 63 (see FIG. 6A). When the stator winding of the electric motor 4 is in the delta connection, Vp (=Vd−Von) described above is input as the reference value Vref2 (see FIG. 6B).

On the other hand, VtΔ described above is input as the reference value Vref1 to the positive terminal of the comparator 622 constituting the first determination circuit 62, regardless of the state of the stator winding of the electric motor 4, that is, regardless of whether the stator winding of the electric motor 4 is in the star connection or the delta connection (see FIGS. 6A and 6B).

When the stator winding of the electric motor 4 is in the star connection, the reference value Vref2 input to the positive terminal of the comparator 632 is VtY as described above (see FIG. 6A). Here, the relationship VtY<VtΔ is satisfied. Therefore, while the input current to the inverter 30 gradually increases and accordingly the current value signal Sc gradually increases, the comparator 632 determines at a certain point of time that the current value signal Sc is larger than the reference value Vref2, and changes the output signal from the high level to the low level. Therefore, at this point of time, the output from the wired OR circuit 661 becomes the low level. As a result, the overcurrent detection signal Se that is the output from the inverting circuit 662, namely the output from the combining circuit 66, becomes the high level. Note that the current value signal Sc is smaller than the reference value Vref1 (=VtΔ) at the time when the comparator 632 changes the output signal from the high level to the low level, so the output signal from the comparator 622 is maintained at the high level.

Thus, when the stator winding of the electric motor 4 is in the star connection, the overcurrent protection circuit 60 changes the overcurrent detection signal Se from the low level to the high level at the time when the current value signal Sc exceeds the threshold value VtY determined for star connection.

When the stator winding of the electric motor 4 is in the delta connection, as described above, the reference value Vref2 input to the positive terminal of the comparator 632 is Vp (=Vd−Von) (see FIG. 6B). The current value signal Sc is configured not to exceed Vp, and the output signal from the comparator 632 is maintained at the high level. Here, the relationship VtΔ<Vp is satisfied. Therefore, while the input current to the inverter 30 gradually increases and accordingly the current value signal Sc gradually increases, the comparator 622 determines at a certain point of time that the current value signal Sc is larger than the reference value Vref1, and changes the output signal from the high level to the low level. Therefore, at this point of time, the output from the wired OR circuit 661 becomes the low level. As a result, the overcurrent detection signal Se that is the output from the inverting circuit 662, namely the output from the combining circuit 66, becomes the high level.

Thus, when the stator winding of the electric motor 4 is in the delta connection, the overcurrent protection circuit 60 changes the overcurrent detection signal Se from the low level to the high level at the time when the current value signal Sc exceeds the threshold value VtΔ determined for delta connection.

As described above, when the stator winding of the electric motor 4 is in the delta connection, the comparison process in the second determination circuit 63 with the threshold value VtY that is the reference value Vref2 corresponding to the star connection is invalidated. Therefore, regardless of whether the stator winding of the electric motor 4 is in the star connection or the delta connection, overcurrent detection is performed based on a comparison result between a threshold value appropriate for each case and the current value signal Sc, so that the electric motor 4 can be protected. A "threshold value appropriate for each case" is a "threshold value corresponding to each wire connection state".

Note that when the overcurrent detection signal Se becomes the high level, the inverter 30 is stopped as described above, and as a result, the current value signal Sc decreases. In FIG. 6, however, the current value signal Sc does not decrease for ease of understanding of the operation of the comparators 622 and 632. The same applies to FIGS. 10, 13, and 15 below.

As described above, the invalidation circuit 65 for invalidating the comparison process in the second determination circuit 63 can be configured with a digital transistor. Since a digital transistor is inexpensive, the cost can be reduced. Furthermore, since the determination circuits 62 and 63 can be configured with comparators configured with relatively inexpensive operational amplifiers, resistors, and the like, the cost can be reduced.

The generation of the threshold values VtΔ and VtY in the determination circuits 62 and 63 is not affected by the circuit constants of the digital transistors. Therefore, the generation of the threshold values and the comparison using the threshold values can be accurately performed. Thus, overcurrent protection can be performed with high accuracy. Since overcurrent protection can be performed with high accuracy, the overcurrent protection level can be set as high as possible with respect to the demagnetizing current, and high output can be achieved.

In a case where a plurality of determination circuits are provided, the microcontroller and the IPM require a plurality of input ports to receive outputs from the determination circuits. However, a typical microcontroller, that is, a general-purpose microcontroller, includes only one input port corresponding to the above-described operation cutoff port (port POE). A general-purpose IPM includes only one input port corresponding to the above-described overcurrent cutoff port Cin. This leads to the problem in that a general-purpose microcontroller and a general-purpose IPM cannot be used for the configuration in which outputs from a plurality of determination circuits are input to the microcontroller and the IPM as they are. On the other hand, in the electric motor drive device 2 according to the present embodiment, since the determination results in the plurality of determination circuits are combined for input to the microcontroller 52 and the IPM 12, a microcontroller that includes only one input port corresponding to the operation cutoff port (port POE) can be used as the microcontroller 52, and an IPM that includes only one input port corresponding to the overcurrent cutoff port Cin can be used as the IPM 12.

In addition, since the overcurrent protection circuit 60, in particular, the first determination circuit 62 and the second determination circuit 63 are configured with hardware, the operation for protection can be performed at high speed.

Further, the forced cutoff unit 525 of the control device 50 is configured with hardware and operates independently of the control program of the microcontroller 52, so that the operation can be performed at high speed. Even when the microcontroller 52 runs out of control, the forced cutoff unit 525 can reliably stop the supply of the PWM signals Sm #1 to Sm #6 to the inverter drive circuit 32.

Further, the switching determination unit 526 of the control device 50 determines, based on the reference value Vref2 generated by the second determination circuit 63 of the overcurrent protection circuit 60, whether the correct protection operation corresponding to the wire connection state of the stator winding of the electric motor 4 is performed by the overcurrent protection circuit 60, and stops the supply of the drive signals Sr #1 to Sr #6 to the inverter drive circuit 32 if the correct protection operation is not performed. Therefore, a highly reliable system can be implemented.

As described above, the electric motor drive device according to the present embodiment includes the first determination circuit that determines whether an excessive current is flowing through the stator winding of the electric motor to be driven when the stator winding is in the delta connection that is the first wire connection state, and the second determination circuit that determines whether an excessive current is flowing through the stator winding of the electric motor to be driven when the stator winding is in the star connection that is the second wire connection state. The electric motor drive device further includes the combining circuit that combines the determination result in the first determination circuit and the determination result in the second determination circuit, and the invalidation circuit that invalidates the determination process by the second determination circuit when the stator winding of the electric motor to be driven is in the delta connection. The electric motor drive device further includes the control device that controls the inverter such that the generation of power for driving the electric motor is stopped when the signal generated by the combining circuit represents that an excessive current is flowing through the stator winding of the electric motor. The electric motor drive device according to the present embodiment performs the determination process as to whether an excessive current is flowing through the stator winding using an appropriate threshold value corresponding to the state of the stator winding, which can enhance the performance of the protection function for preventing the permanent magnet constituting the rotor of the electric motor from being demagnetized. In addition, since the combining circuit that combines a plurality of determination results for output as one signal is provided, the CPU of the microcontroller constituting the control device requires only one input port for receiving determination results. Therefore, it is possible to implement the electric motor drive device capable of enhancing the performance of the protection function for protecting the electric motor while preventing an increase in the number of input ports required by the CPU to be used.

Second Embodiment

Next, an electric motor drive device according to a second embodiment will be described. The overall configuration of the electric motor drive device according to the second embodiment is the same as that of the electric motor drive device 2 according to the first embodiment (see FIG. 1). Hereinafter, for convenience of explanation, the electric motor drive device according to the second embodiment is referred to as an electric motor drive device 2a. The difference between the electric motor drive device 2a according to the second embodiment and the electric motor drive device 2 according to the first embodiment is the overcurrent protection circuit.

Figure 7:
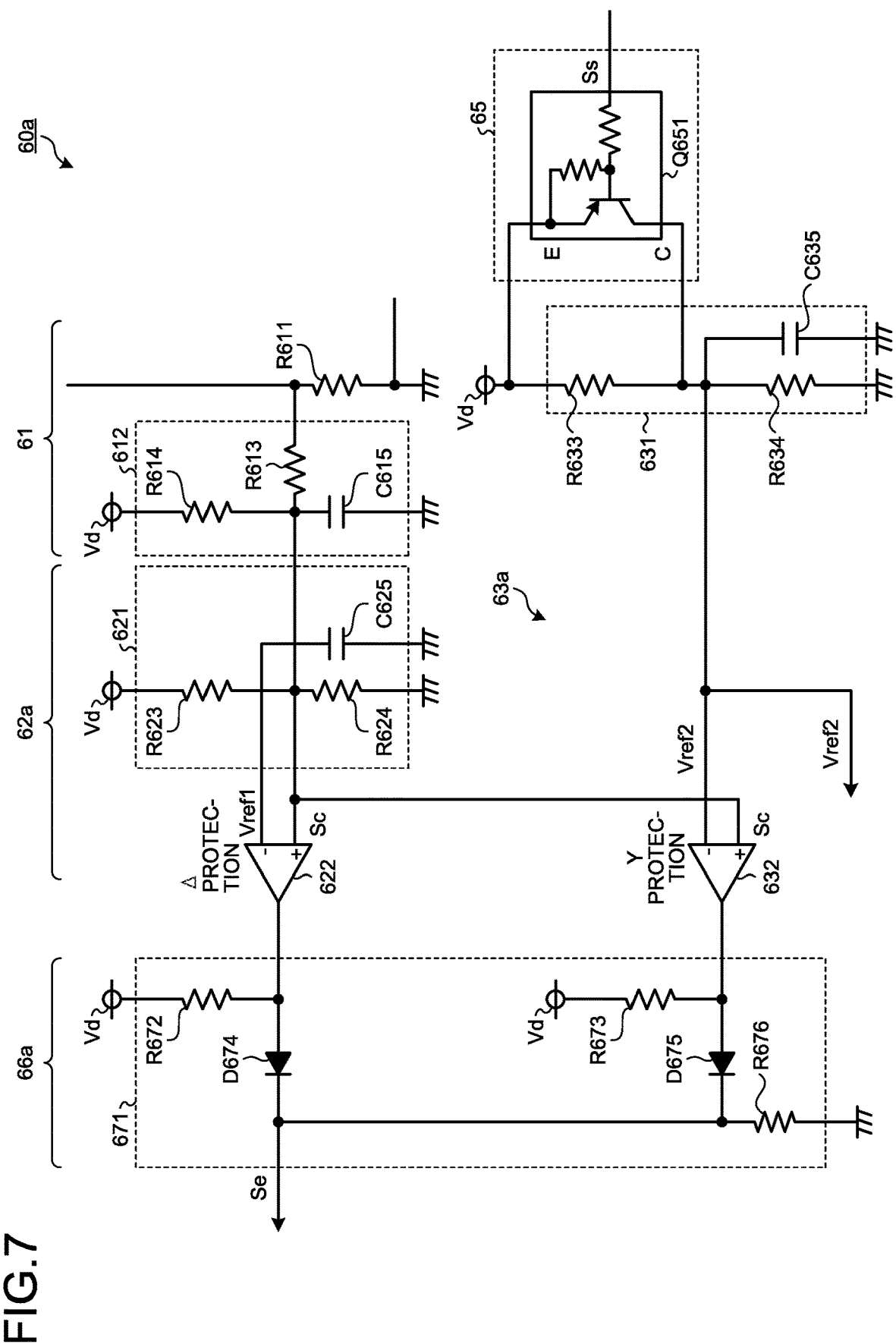
FIG. 7 is a wiring diagram illustrating an example of an overcurrent protection circuit according to a second embodiment.

FIG. 7 is a diagram illustrating an exemplary configuration of an overcurrent protection circuit 60a of the electric motor drive device 2a according to the second embodiment. The overcurrent protection circuit 60a includes the current detection circuit 61, a first determination circuit 62a, a second determination circuit 63a, the invalidation circuit 65, and a combining circuit 66a. The current detection circuit 61 and the invalidation circuit 65 of the overcurrent protection circuit 60a are the same as the current detection circuit 61 and the invalidation circuit 65 of the overcurrent protection circuit 60 according to the first embodiment illustrated in FIG. 5. Therefore, the description of the current detection circuit 61 and the invalidation circuit 65 is omitted.

Similarly to the first determination circuit 62 of the overcurrent protection circuit 60 according to the first embodiment, the first determination circuit 62a includes the threshold value generation circuit 621 and the comparator 622. The difference between the first determination circuit 62 according to the first embodiment and the first determination circuit 62a is the connection relationship between the threshold value generation circuit 621 and the comparator 622. Specifically, in the first determination circuit 62 according to the first embodiment, the reference value Vref1 generated by the threshold value generation circuit 621 is input to the positive terminal of the comparator 622, and the current value signal Sc from the current detection circuit 61 is input to the negative terminal of the comparator 622. In contrast, in the first determination circuit 62a, the reference value Vref1 is input to the negative terminal of the comparator 622, and the current value signal Sc is input to the positive terminal of the comparator 622.

Similarly to the second determination circuit 63 of the overcurrent protection circuit 60 according to the first embodiment, the second determination circuit 63a includes the threshold value generation circuit 631 and the comparator 632. The difference between the second determination circuit 63 according to the first embodiment and the second determination circuit 63a is the connection relationship between the threshold value generation circuit 631 and the comparator 632. Specifically, in the second determination circuit 63 according to the first embodiment, the reference value Vref2 generated by the threshold value generation circuit 631 is input to the positive terminal of the comparator 632, and the current value signal Sc from the current detection circuit 61 is input to the negative terminal of the comparator 632. In contrast, in the second determination circuit 63a, the reference value Vref2 is input to the negative terminal of the comparator 632, and the current value signal Sc is input to the positive terminal of the comparator 632.

The combining circuit 66a includes a diode OR circuit 671. The diode OR circuit 671 includes resistors R672 and R673, diodes D674 and D675, and a resistor R676. The first end of the resistor R672 is connected to a control power supply that outputs a control voltage Vd, and the second end of the resistor R672 is connected to the output terminal of the comparator 622 and the anode of the diode D674. The anode of the diode D674 is connected to the output terminal of the comparator 622 and the second end of the resistor R672, and the cathode of the diode D674 is connected to the first end of the resistor R676 and the cathode of the diode D675. The first end of the resistor R673 is connected to a control power supply that outputs a control voltage Vd, and the second end of the resistor R673 is connected to the output terminal of the comparator 632 and the anode of the diode D675. The anode of the diode D675 is connected to the output terminal of the comparator 632 and the second end of the resistor R673, and the cathode of the diode D675 is connected to the first end of the resistor R676 and the cathode of the diode D674. The second end of the resistor R676 is connected to the ground.

The diode OR circuit 671 outputs a high-level signal as the overcurrent detection signal Se when at least one of the output signal from the comparator 622 and the output signal from the comparator 632 is at the high level, and outputs a low-level signal as the overcurrent detection signal Se when both the output signal from the comparator 622 and the output signal from the comparator 632 are at the low level.

The operation of the overcurrent protection circuit 60a in response to a gradual increase in the input current to the inverter 30 is the same as the operation described with reference to FIG. 6 in the first embodiment. However, the logical values of the output signals from the comparators 622 and 632 are opposite to the logical values illustrated in the second and third stages from the bottom in FIG. 6.

In the electric motor drive device 2a according to the present embodiment, the overcurrent protection circuit 60a generates the overcurrent detection signal Se in the same manner as the overcurrent protection circuit 60 according to the first embodiment. Therefore, the electric motor drive device 2a according to the present embodiment can achieve the same effect as the electric motor drive device 2 according to the first embodiment.

Third Embodiment

Figure 8:
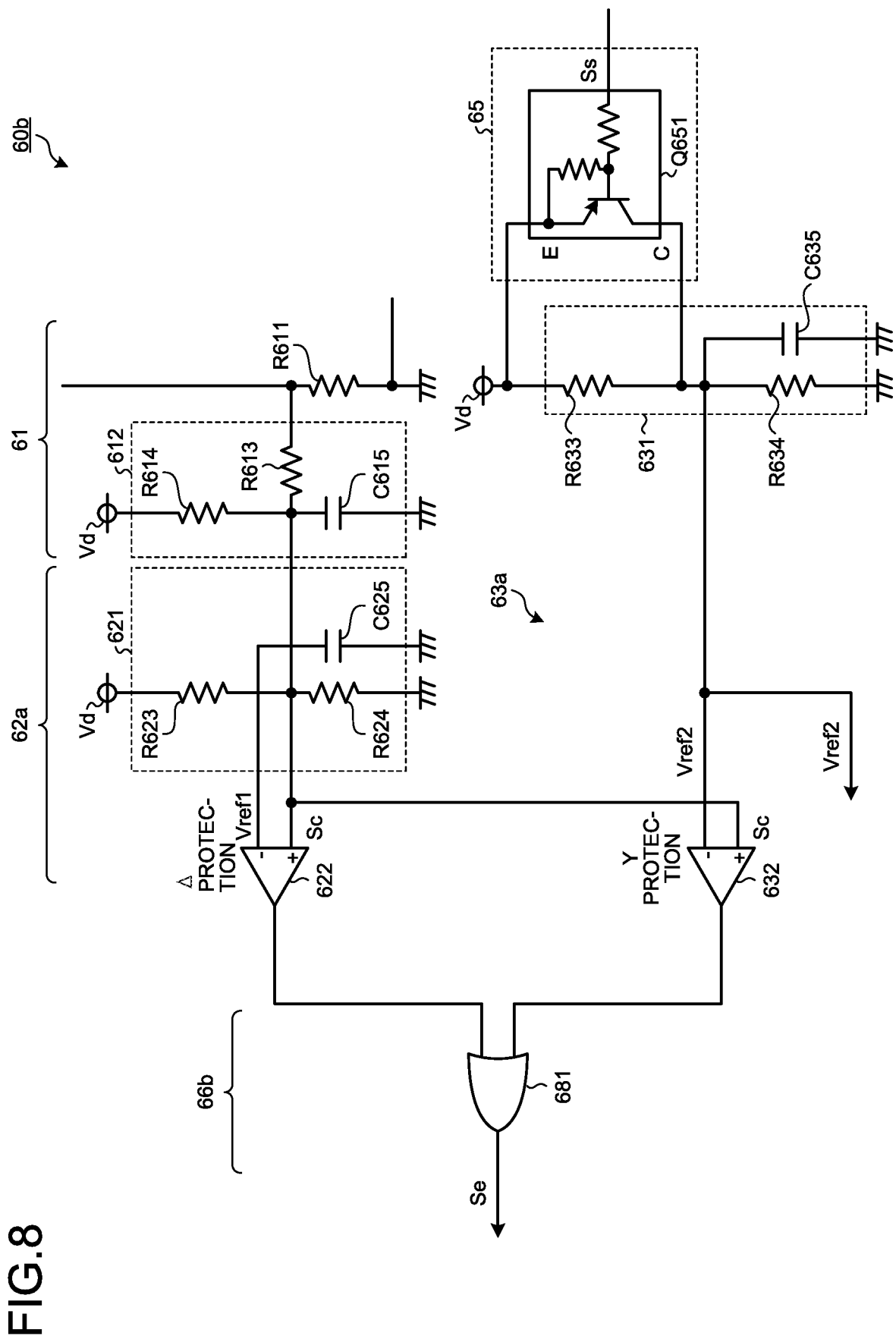
FIG. 8 is a wiring diagram illustrating an example of an overcurrent protection circuit according to a third embodiment.

In the electric motor drive device 2a according to the second embodiment, the combining circuit 66a of the overcurrent protection circuit 60a is implemented by the diode OR circuit 671. Alternatively, an OR circuit that operates similarly to the diode OR circuit 671 may be implemented by a combination of transistors such as metal-oxide-semiconductor (MOS) transistors. The configuration of such an overcurrent protection circuit is illustrated in FIG. 8. An overcurrent protection circuit 60b of the electric motor drive device according to the third embodiment illustrated in FIG. 8 is obtained by replacing the combining circuit 66a of the overcurrent protection circuit 60a illustrated in FIG. 7 with a combining circuit 66b. The combining circuit 66b is an OR circuit 681 including a combination of transistors.

Since the operation of the overcurrent protection circuit 60b is the same as that of the overcurrent protection circuit 60a, the description thereof is omitted.

The electric motor drive device according to the present embodiment performs the same operation as the electric motor drive device 2a according to the second embodiment, and can achieve the same effect as the electric motor drive devices according to the first and second embodiments.

Fourth Embodiment

In the electric motor drive devices described in the first to third embodiments, when invalidating the comparison process with the threshold value VtY in the second determination circuit corresponding to the star connection of the stator winding of the electric motor 4, Vp (=Vd−Von) appears at the voltage dividing node of the threshold value generation circuit 631 of the second determination circuit. However, this configuration is not essential. In short, any configuration may be used as long as a potential Vp higher than the reference value Vref1 (=VtΔ) output from the threshold value generation circuit 621 of the first determination circuit appears at the voltage dividing node of the threshold value generation circuit 631 of the second determination circuit, and is input as the reference value Vref2 to the comparator 632.

Figure 9:
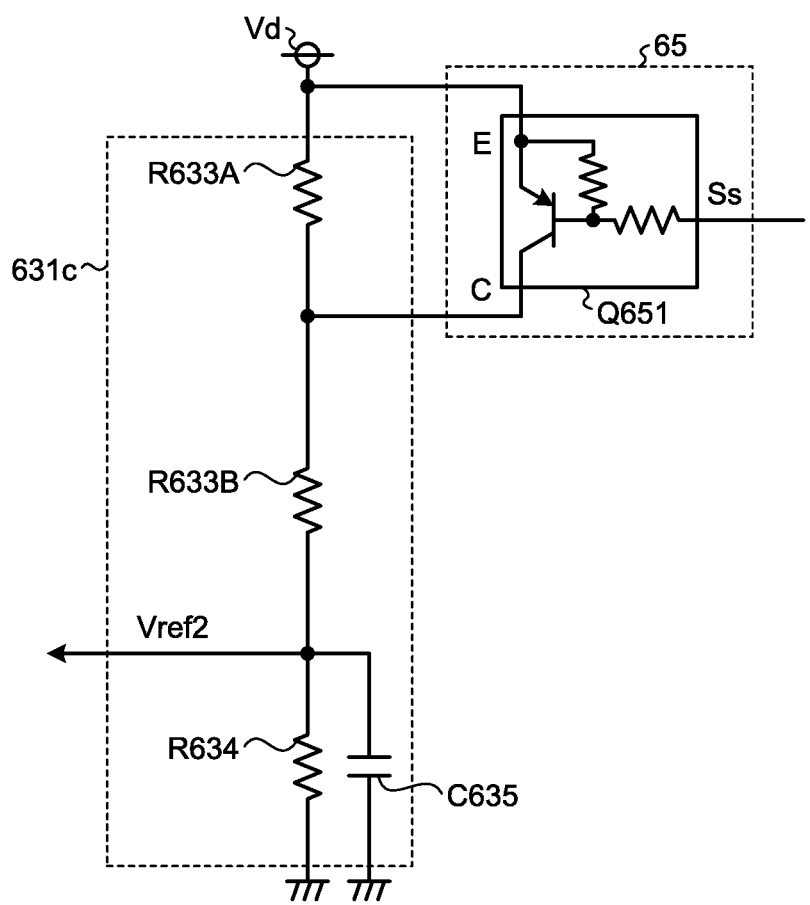
FIG. 9 is a diagram illustrating an example of a threshold value generation circuit provided in a second determination circuit of an overcurrent protection circuit according to a fourth embodiment.

For example, instead of the threshold value generation circuit 631 (see FIG. 5) of the second determination circuit 63 described in the first embodiment, a threshold value generation circuit 631c illustrated in FIG. 9 may be used, and the invalidation circuit 65 may be connected to the threshold value generation circuit 631c as illustrated in FIG. 9.

The threshold value generation circuit 631c illustrated in FIG. 9 is obtained by replacing the resistor R633 of the threshold value generation circuit 631 illustrated in FIG. 5 and the like with a resistor R633A and a resistor R633B connected in series. Therefore, in the threshold value generation circuit 631c, the voltage dividing circuit is configured with the resistors R633A, R633B, and R634 connected in series, and the digital transistor Q651 is provided so as to short-circuit the two ends of the resistor R633A.

The resistance values of the resistors R633A and R633B of the threshold value generation circuit 631c are determined such that the relationship with the resistor R633 of the threshold value generation circuit 631 satisfies Formula (4).

$$R633A+R633B=R633 \quad (4)$$

When the threshold value generation circuit 631c illustrated in FIG. 9 is applied, the operation of the overcurrent protection circuit in the off time of the digital transistor Q651, that is, the operation of the overcurrent protection circuit for the case that the stator winding of the electric motor 4 is in the star connection, is the same as the operation of the overcurrent protection circuit 60 (see FIG. 5) described with reference to FIG. 6A.

Figure 10:
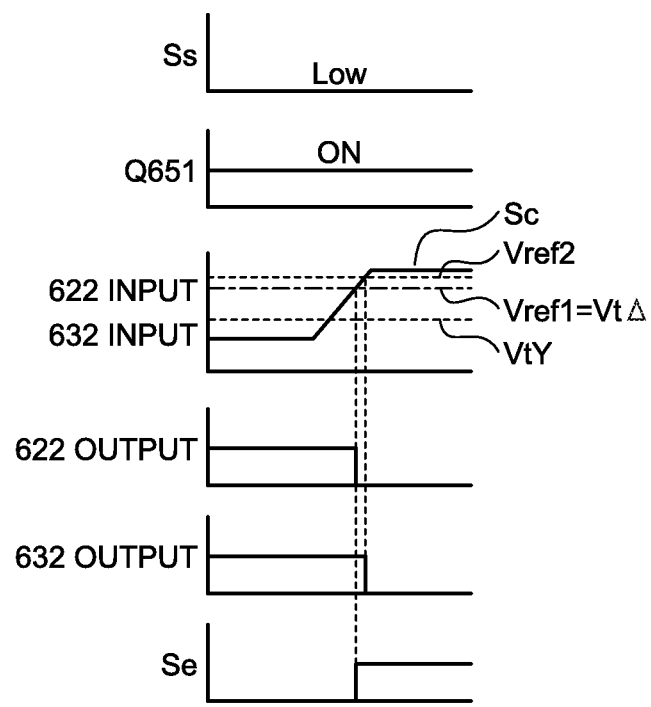
FIG. 10 is a time chart illustrating an example of the operation of the overcurrent protection circuit according to the fourth embodiment.

In the overcurrent protection circuit to which the threshold value generation circuit 631c illustrated in FIG. 9 is applied, the operation of the overcurrent protection circuit in the on time of the digital transistor Q651, that is, the operation of the overcurrent protection circuit for the case that the stator winding of the electric motor 4 is in the delta connection, is as illustrated in FIG. 10.

In the overcurrent protection circuit to which the threshold value generation circuit 631c illustrated in FIG. 9 is applied, when the digital transistor Q651 is on, the voltage Vp expressed by Formula (5) appears at the voltage dividing node of the threshold value generation circuit 631c, and this voltage Vp is input to the comparator 632 as the reference value Vref2. Here, the voltage dividing node is the connection point between the resistor R633B and the resistor R634. In Formula (5), Von represents the amount of voltage drop between the emitter and the collector in the on state of the digital transistor Q651.

$$Vp=(Vd-Von) \times R634/(R633B+R634) \quad (5)$$

As illustrated in FIG. 10, since Vp (=Vref2) is larger than VtΔ (=Vref1), when the stator winding of the electric motor 4 is in the delta connection, the comparator 622 determines that the current value signal Sc exceeds VtΔ before the comparator 632 determines that Sc exceeds Vp. Accordingly, at the time when the current value signal Sc exceeds VtΔ, the overcurrent detection signal Se becomes the high level. Thus, the overcurrent detection signal Se becomes the high level at the time when Sc exceeds VtΔ, as in the operation of the overcurrent protection circuit 60 described with reference to FIG. 6B.

In designing, it is desirable to determine the element constants such that Vp is sufficiently larger than VtΔ in consideration of variations in the element constants. That is, it is desirable to determine the resistance values of the resistors R633B and R634 such that Vp represented by Formula (5) is larger than VtΔ plus a margin.

Fifth Embodiment

Next, an electric motor drive device according to a fifth embodiment will be described. The overall configuration of the electric motor drive device according to the fifth embodiment is the same as that of the electric motor drive device 2 according to the first embodiment (see FIG. 1). Hereinafter, for convenience of explanation, the electric motor drive device according to the fifth embodiment is referred to as an electric motor drive device 2d. The difference between the electric motor drive device 2d according to the fifth embodiment and the electric motor drive device 2 according to the first embodiment is the overcurrent protection circuit. The overcurrent protection circuit of the electric motor drive device 2d is referred to as an overcurrent protection circuit 60d. The overcurrent protection circuit 60d has a circuit configuration similar to that of the overcurrent protection circuit 60 of the electric motor drive device 2, but operates differently in some circuits.

Figure 11:
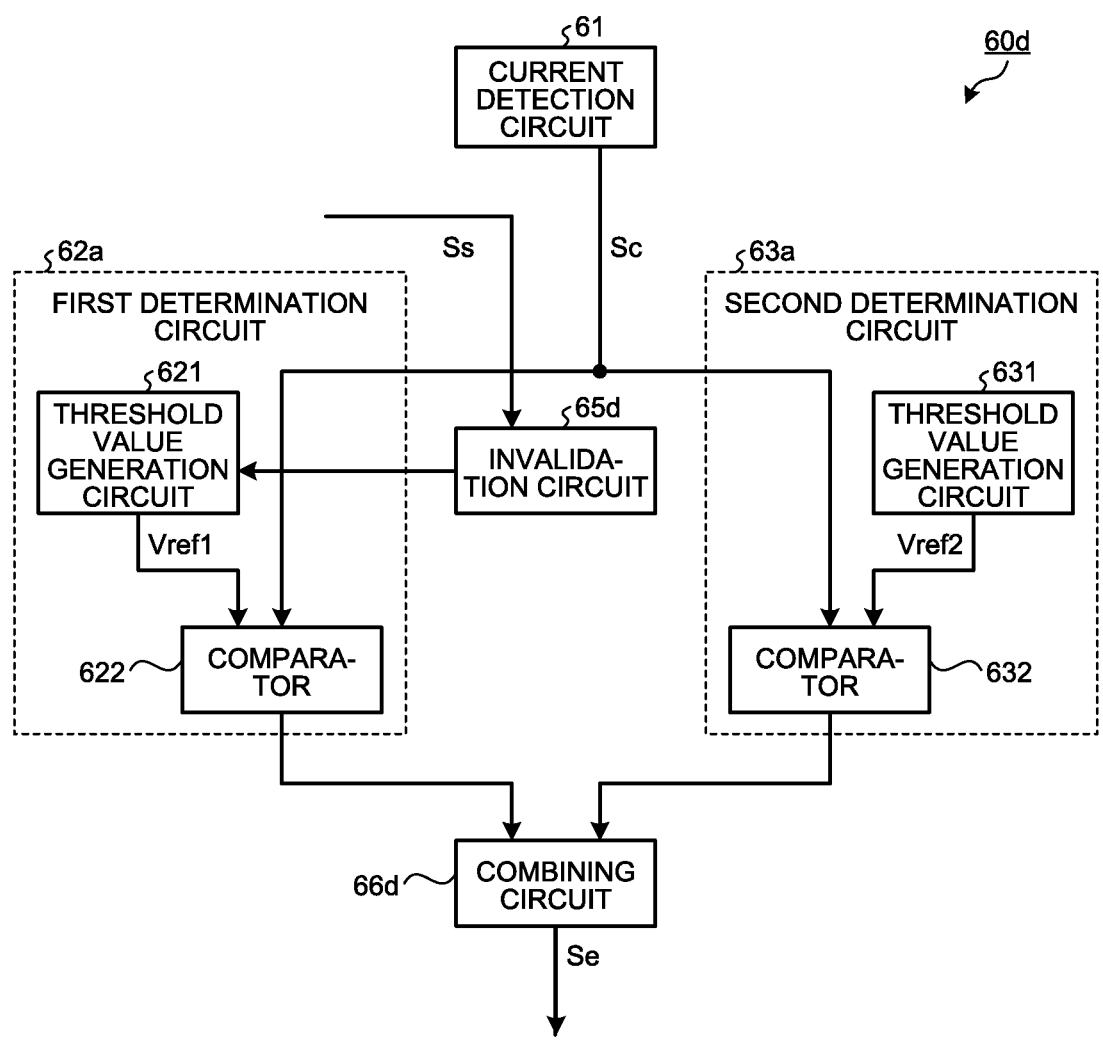
FIG. 11 is a block diagram illustrating an exemplary schematic configuration of an overcurrent protection circuit according to a fifth embodiment.

FIG. 11 is a block diagram illustrating an exemplary schematic configuration of the overcurrent protection circuit 60d according to the fifth embodiment. As illustrated in FIG. 11, the overcurrent protection circuit 60d includes the current detection circuit 61, the first determination circuit 62a, the second determination circuit 63a, an invalidation circuit 65d, and a combining circuit 66d. The current detection circuit 61 illustrated in FIG. 11 is the same as the current detection circuit 61 of the overcurrent protection circuit 60 described in the first embodiment. The first determination circuit 62a and the second determination circuit 63a illustrated in FIG. 11 are the same as the first determination circuit 62a and the second determination circuit 63a of the overcurrent protection circuit 60a described in the second embodiment. The details of the current detection circuit 61, the first determination circuit 62a, and the second determination circuit 63a will not be described.

Each of the overcurrent protection circuits 60, 60a, and 60b described in the first to fourth embodiments is configured to invalidate the comparison process in the second determination circuit 63 or 63a between the current value signal Sc and the threshold value VtY for star connection when the stator winding of the electric motor 4 is in the delta connection. On the other hand, the overcurrent protection circuit 60d according to the present embodiment is configured to invalidate the comparison process in the first determination circuit 62a between the current value signal Sc and the threshold value VtΔ for delta connection when the stator winding of the electric motor 4 is in the star connection. For example, in the overcurrent protection circuit 60d, when the stator winding of the electric motor 4 is in the star connection, the invalidation circuit 65d extremely reduces the reference value Vref1 to be compared with the current value signal Sc in the first determination circuit 62a, so that the determination result that "the current value signal Sc exceeds the reference value Vref1" is always obtained. Then, the combining circuit 66d combines, using AND, the determination result in the first determination circuit 62a and the determination result in the second determination circuit 63a.

Further, in the electric motor drive devices described in the first to fourth embodiments, the reference value Vref2 of the two reference values generated by the overcurrent protection circuit is input to the switching determination unit 526 of the control device 50. However, in the electric motor drive device 2d according to the present embodiment, the reference value Vref1 is input to the switching determination unit 526 of the control device 50. That is, the switching determination unit 526 of the electric motor drive device 2d determines using the reference value Vref1 whether the correct protection operation is performed by the overcurrent protection circuit 60d using the correct reference value corresponding to the wire connection state of the stator winding.

The electric motor drive device 2d to which the configuration described in the present embodiment is applied can achieve the same effect as the electric motor drive devices described in the first to fourth embodiments.

Figure 12:
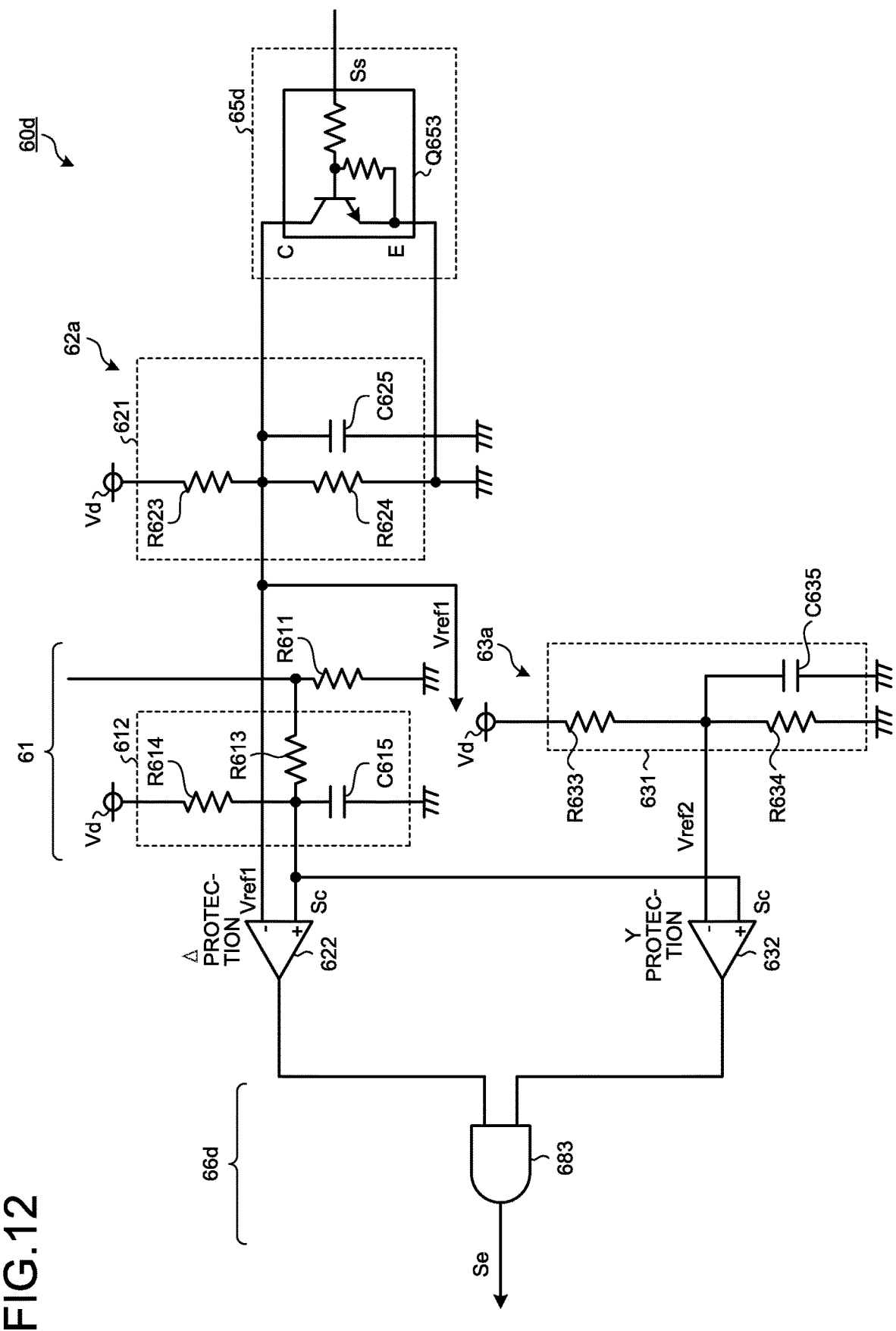
FIG. 12 is a wiring diagram illustrating an example of the overcurrent protection circuit according to the fifth embodiment.

FIG. 12 is a wiring diagram illustrating an example of the overcurrent protection circuit 60d according to the fifth embodiment. The positions of the current detection circuit 61 and the threshold value generation circuit 621 of the first determination circuit 62a in FIG. 7 are reversed in FIG. 12, but the current detection circuit 61 and the first determination circuit 62a of the overcurrent protection circuit 60d are the same as the current detection circuit 61 and the first determination circuit 62a of the overcurrent protection circuit 60a illustrated in FIG. 7.

In the second determination circuit 63a, the threshold value generation circuit 631 generates the voltage VtY expressed by Formula (6), and inputs this voltage VtY to the negative terminal of the comparator 632 as the reference value Vref2.

$$VtY = Vd \times R634/(R633+R634) \quad (6)$$

The invalidation circuit 65d includes an npn-type digital transistor Q653. The collector and emitter of the digital transistor Q653 are connected to the two ends of the resistor R624 constituting the threshold value generation circuit 621 of the first determination circuit 62a, that is, the first and second ends of the resistor R624, respectively.

The inverted wire connection selection signal Ss output from the control device 50 is input to the base of the digital transistor Q653. The digital transistor Q653 is turned off when the inverted wire connection selection signal Ss is at the low level, that is, when the stator winding of the electric motor 4 is in the delta connection. The digital transistor Q653 is turned on when the inverted wire connection selection signal Ss is at the high level, that is, when the stator winding of the electric motor 4 is in the star connection.

When the digital transistor Q653 is off, the threshold value generation circuit 621 of the first determination circuit 62a generates the voltage VtΔ expressed by Formula (7) for input as the reference value Vref1 to the negative terminal of the comparator 622.

$$VtΔ = Vd \times R624/(R623+R624) \quad (7)$$

That is, the voltage VtΔ is generated by the threshold value generation circuit 621 when the stator winding of the electric motor 4 is in the delta connection and the digital transistor Q653 is turned off, and is input to the negative terminal of the comparator 622 as the reference value Vref1 that is the first reference value. The voltage VtΔ is a threshold value for delta connection.

The resistance values of the resistors R623 and R624 constituting the threshold value generation unit 621 of the first determination circuit 62a and the resistance values of the resistors R633 and R634 constituting the threshold value generation circuit 631 of the second determination circuit 63a are determined such that VtΔ expressed by Formula (7) and VtY expressed by Formula (6) satisfy the relationship of Formula (3) above or satisfy "VtY<VtΔ<√3×VtY".

When the digital transistor Q653 is on, the resistor R624 is short-circuited by the digital transistor Q653. Therefore, the threshold value generation circuit 621 of the first determination circuit 62a generates a potential close to the ground potential 0 V, specifically, the voltage higher than the ground potential 0 V by an amount equivalent to the amount of voltage drop between the collector and the emitter in the on time of the digital transistor Q653. In this case, Vq=Von is satisfied, where Von represents the amount of voltage drop between the collector and the emitter in the on state of the digital transistor Q653, and Vq represents the voltage generated by the threshold value generation circuit 621 at this time. That is, when the digital transistor Q653 is turned on, the threshold value generation circuit 621 generates Vq=Von instead of the threshold value VtΔ expressed by Formula (7) above, and this Vq is input as the reference value Vref1 to the negative terminal of the comparator 622. In this case, the comparator 622 compares Vq=Von input through the negative terminal and the current value signal Sc input through the positive terminal, and outputs the comparison result to the combining circuit 66d.

On the other hand, when the digital transistor Q653 is off, the threshold value generation circuit 621 of the first determination circuit 62a generates the threshold value VtΔ expressed by Formula (7) above for input as the reference value Vref1 to the negative terminal of the comparator 622.

The comparator 622 compares the current value signal Sc with the reference value Vref1. If the current value signal Sc is larger than the reference value Vref1, the comparator 622 outputs a high-level signal to the combining circuit 66d. If the current value signal Sc is equal to or lower than the reference value Vref1, the comparator 622 outputs a low-level signal to the combining circuit 66d.

The combining circuit 66d includes an AND circuit 683. The AND circuit 683 outputs the high-level overcurrent detection signal Se when both the signal output from the comparator 622 of the first determination circuit 62a and the signal output from the comparator 632 of the second determination circuit 63a are at the high level. The AND circuit 683 outputs the low-level overcurrent detection signal Se when at least one of the signal output from the comparator 622 of the first determination circuit 62a and the signal output from the comparator 632 of the second determination circuit 63a is at the low level.

Hereinafter, the operation of the first determination circuit 62a, the second determination circuit 63a, and the combining circuit 66d of the overcurrent protection circuit 60d will be described with reference to FIG. 13.

Figure 13A:
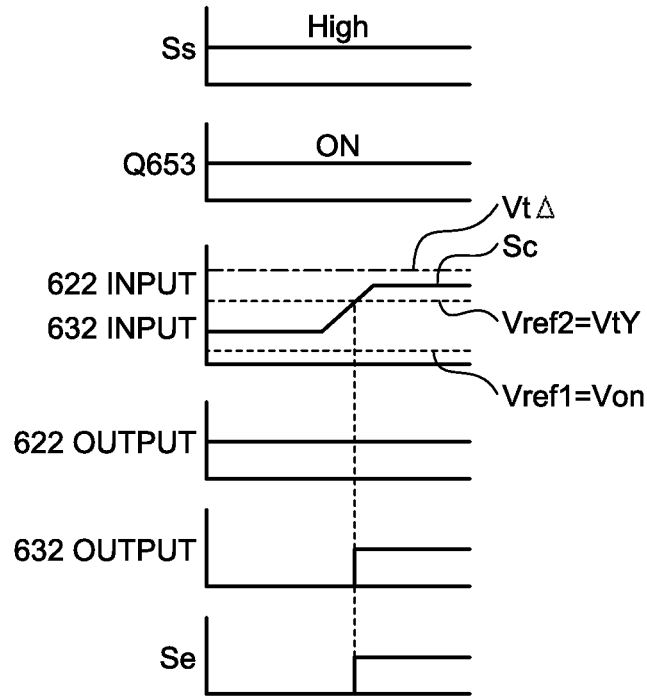
FIG. 13 is a time chart illustrating an example of the operation of the overcurrent protection circuit according to the fifth embodiment.
Figure 13B:
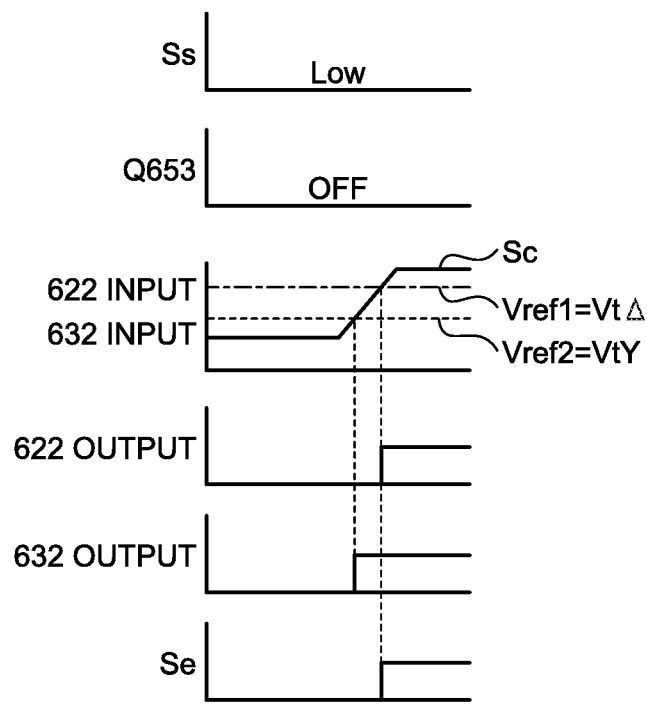

The inverted wire connection selection signal Ss that is supplied to the base of the digital transistor Q653, namely the invalidation circuit 65d, is output from the wire connection switching control unit 521 of the control device 50 as described above. When the stator winding of the electric motor 4 is in the star connection, the inverted wire connection selection signal Ss becomes the high level as illustrated in FIG. 13A. When the stator winding of the electric motor 4 is in the delta connection, the inverted wire connection selection signal Ss becomes the low level as illustrated in FIG. 13B. Therefore, the digital transistor Q653 is turned on as illustrated in FIG. 13A when the stator winding of the electric motor 4 is in the star connection, and is turned off as illustrated in FIG. 13B when the stator winding of the electric motor 4 is in the delta connection.

Therefore, when the stator winding of the electric motor 4 is in the delta connection, VtΔ described above is input as the reference value Vref1 to the negative terminal of the comparator 622 constituting the first determination circuit 62a (see FIG. 13B). When the stator winding of the electric motor 4 is in the star connection, Vq (=Von) described above is input as the reference value Vref1 (see FIG. 13A).

On the other hand, VtY described above is input as the reference value Vref2 to the negative terminal of the comparator 632 constituting the second determination circuit 63a, regardless of the state of the stator winding of the electric motor 4, that is, regardless of whether the stator winding of the electric motor 4 is in the star connection or the delta connection (see FIGS. 13A and 13B).

When the stator winding of the electric motor 4 is in the delta connection, the reference value Vref1 input to the negative terminal of the comparator 622 is VtΔ as described above (see FIG. 13B). Here, the relationship VtY<VtΔ is satisfied. Therefore, while the input current to the inverter 30 gradually increases and accordingly the current value signal Sc gradually increases, the comparator 632 determines at a certain point of time that the current value signal Sc is larger than the reference value Vref2 (=VtY), and changes the output signal from the low level to the high level. Thereafter, while the current value signal Sc further increases, the comparator 622 determines that the current value signal Sc is larger than the reference value Vref1 (=VtΔ), and changes the output signal from the low level to the high level. As a result, the overcurrent detection signal Se that is the output from the AND circuit 683, namely the output from the combining circuit 66d, becomes the high level.

Thus, when the stator winding of the electric motor 4 is in the delta connection, the overcurrent protection circuit 60d changes the overcurrent detection signal Se from the low level to the high level at the time when the current value signal Sc exceeds the threshold value VtΔ determined for delta connection.

When the stator winding of the electric motor 4 is in the star connection, the reference value Vref1 input to the negative terminal of the comparator 622 is Vq (=Von) as described above (see FIG. 13A). The current value signal Sc is configured not to exceed Vq, and the output signal from the comparator 622 is maintained at the high level. Therefore, while the input current to the inverter 30 gradually increases and accordingly the current value signal Sc gradually increases, the comparator 632 determines at a certain point of time that the current value signal Sc is larger than the reference value Vref2, and changes the output signal from the low level to the high level. As a result, the overcurrent detection signal Se that is the output from the AND circuit 683, namely the output from the combining circuit 66d, becomes the high level.

Thus, when the stator winding of the electric motor 4 is in the star connection, the overcurrent protection circuit 60d changes the overcurrent detection signal Se from the low level to the high level at the time when the current value signal Sc exceeds the threshold value VtY determined for star connection.

As described above, when the stator winding of the electric motor 4 is in the star connection, the comparison process in the first determination circuit 62a with the threshold value VtΔ that is the reference value Vref1 corresponding to the delta connection is invalidated. Therefore, regardless of whether the stator winding of the electric motor 4 is in the star connection or the delta connection, overcurrent detection is performed based on a comparison result between a threshold value appropriate for each case and the current value signal Sc, so that the electric motor 4 can be protected.

Sixth Embodiment

In the electric motor drive device 2d described in the fifth embodiment, when invalidating the comparison process with the threshold value VtΔ in the first determination circuit 62a corresponding to the delta connection of the stator winding of the electric motor 4, Vq (=Von) appears at the voltage dividing node of the threshold value generation circuit 621 of the first determination circuit 62a. However, this configuration is not essential. In short, any configuration may be used as long as a potential Vq lower than the reference value Vref2 (=VtY) output from the threshold value generation circuit 631 of the second determination circuit 63a appears at the voltage dividing node of the threshold value generation circuit 621 of the first determination circuit 62a, and is input as the reference value Vref1 to the comparator 622.

Figure 14:
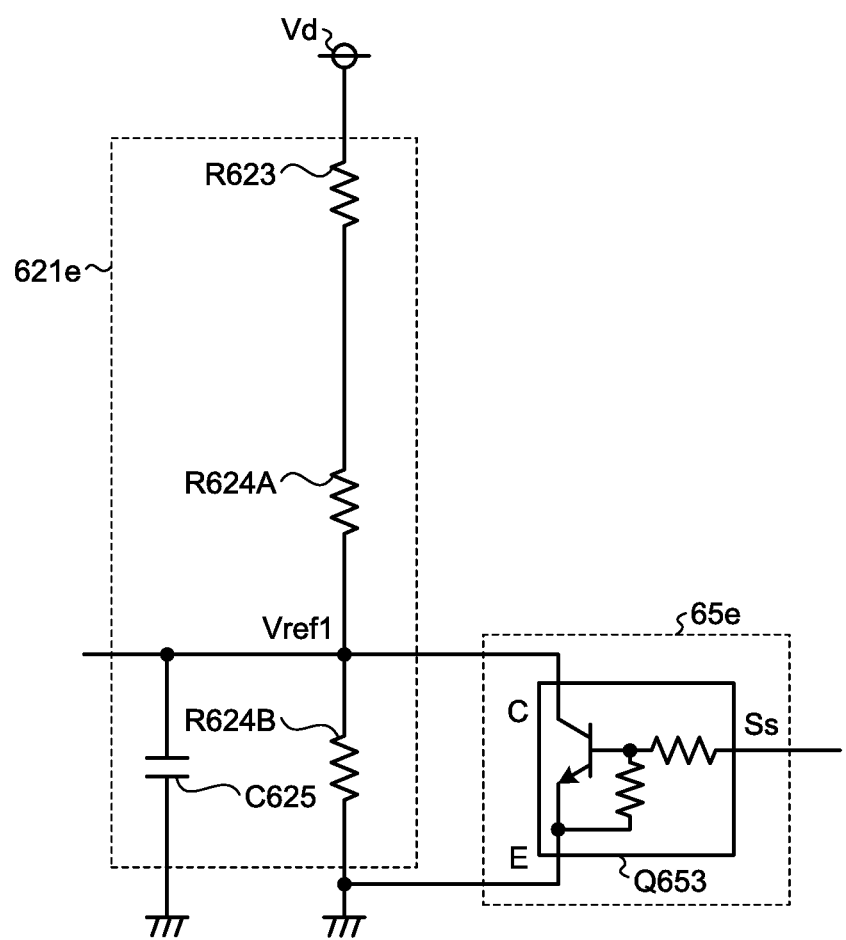
FIG. 14 is a diagram illustrating an example of a threshold value generation circuit provided in a first determination circuit of an overcurrent protection circuit according to a sixth embodiment.

For example, instead of the threshold value generation circuit 621 (see FIG. 12) of the first determination circuit 62a, a threshold value generation circuit 621e illustrated in FIG. 14 may be used, and an invalidation circuit 65e may be connected to the threshold value generation circuit 621e as illustrated in FIG. 14. The invalidation circuit 65e includes the npn-type digital transistor Q653 similarly to the invalidation circuit 65d illustrated in FIG. 12.

The threshold value generation circuit 621e illustrated in FIG. 14 is obtained by replacing the resistor R624 of the threshold value generation circuit 621 with a resistor R624A and a resistor R624B connected in series. Therefore, in the threshold value generation circuit 621e, the voltage dividing circuit is configured with the resistors R623, R624A, and R624B connected in series, and the digital transistor Q653 is provided so as to short-circuit the two ends of the resistor R624B.

The resistance values of the resistors R624A and R624B of the threshold value generation circuit 621e are determined such that the relationship with the resistor R624 of the threshold value generation circuit 621 satisfies Formula (8).

$$R624A + R624B = R624 \quad (8)$$

When the threshold value generation circuit 621e illustrated in FIG. 14 is applied, the operation of the overcurrent protection circuit in the off time of the digital transistor Q653, that is, the operation of the overcurrent protection circuit for the case that the stator winding of the electric motor 4 is in the delta connection, is the same as the operation of the overcurrent protection circuit 60d (see FIG. 12) described with reference to FIG. 13B.

Figure 15:
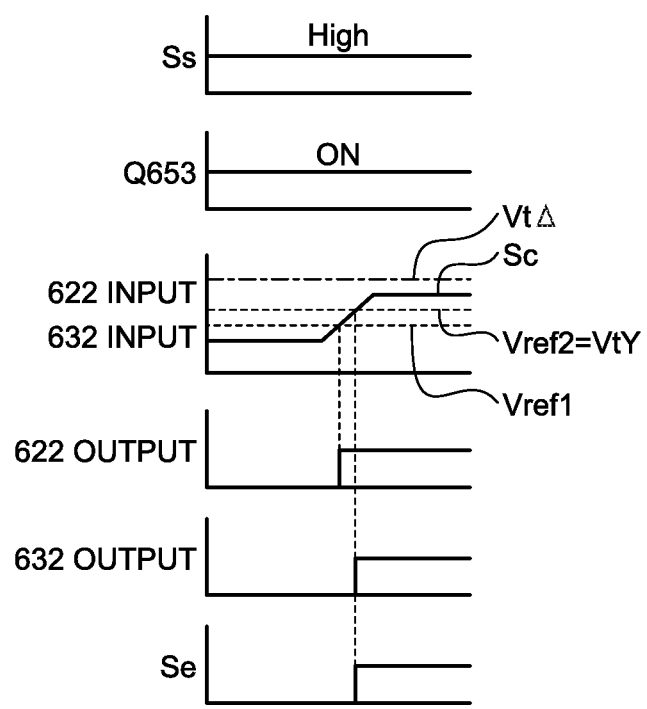
FIG. 15 is a time chart illustrating an example of the operation of the overcurrent protection circuit according to the sixth embodiment.

In the overcurrent protection circuit to which the threshold value generation circuit 621e illustrated in FIG. 14 is applied, the operation of the overcurrent protection circuit in the on time of the digital transistor Q653, that is, the operation of the overcurrent protection circuit for the case that the stator winding of the electric motor 4 is in the star connection, is as illustrated in FIG. 15.

In the overcurrent protection circuit to which the threshold value generation circuit 621e illustrated in FIG. 14 is applied, when the digital transistor Q653 is on, the voltage Vq expressed by Formula (9) appears at the voltage dividing node of the threshold value generation circuit 621e, and this voltage Vq is input to the comparator 622 as the reference value Vref1. Here, the voltage dividing node is the connection point between the resistor R624A and the resistor R624B. In Formula (9), Von represents the amount of voltage drop between the collector and the emitter in the on state of the digital transistor Q653.

$$Vq = \{(Vd - Von) \times R624A/(R623 + R624A)\} + Von \quad (9)$$

As illustrated in FIG. 15, since Vq (=Vref1) is smaller than VtY (=Vref2), when the stator winding of the electric motor 4 is in the star connection, the comparator 632 determines that the current value signal Sc exceeds VtY after the comparator 622 determines that Sc exceeds Vq. Accordingly, at the time when the current value signal Sc exceeds VtY, the overcurrent detection signal Se becomes the high level. Thus, the overcurrent detection signal Se becomes the high level at the time when Sc exceeds VtY, as in the operation of the overcurrent protection circuit 60d described with reference to FIG. 13B.

In designing, it is desirable to determine the element constants such that Vq is sufficiently smaller than VtY in consideration of variations in the element constants. That is, it is desirable to determine the resistance values of the resistors R623 and R624A such that Vq represented by Formula (9) is smaller than VtY minus a margin.

Seventh Embodiment

Next, an electric motor drive device according to a seventh embodiment will be described. The overall configuration of the electric motor drive device according to the seventh embodiment is the same as that of the electric motor drive device 2 according to the first embodiment (see FIG. 1). Hereinafter, for convenience of explanation, the electric motor drive device according to the seventh embodiment is referred to as an electric motor drive device 2f.

In the electric motor drive devices described in the first to sixth embodiments, the wire connection switching unit 40 that switches the wire connection state of the stator winding of the electric motor 4 is implemented by changeover switches. Alternatively, the wire connection switching unit 40 may be implemented using normally closed switches and normally open switches, instead of the changeover switches.

Figure 16:
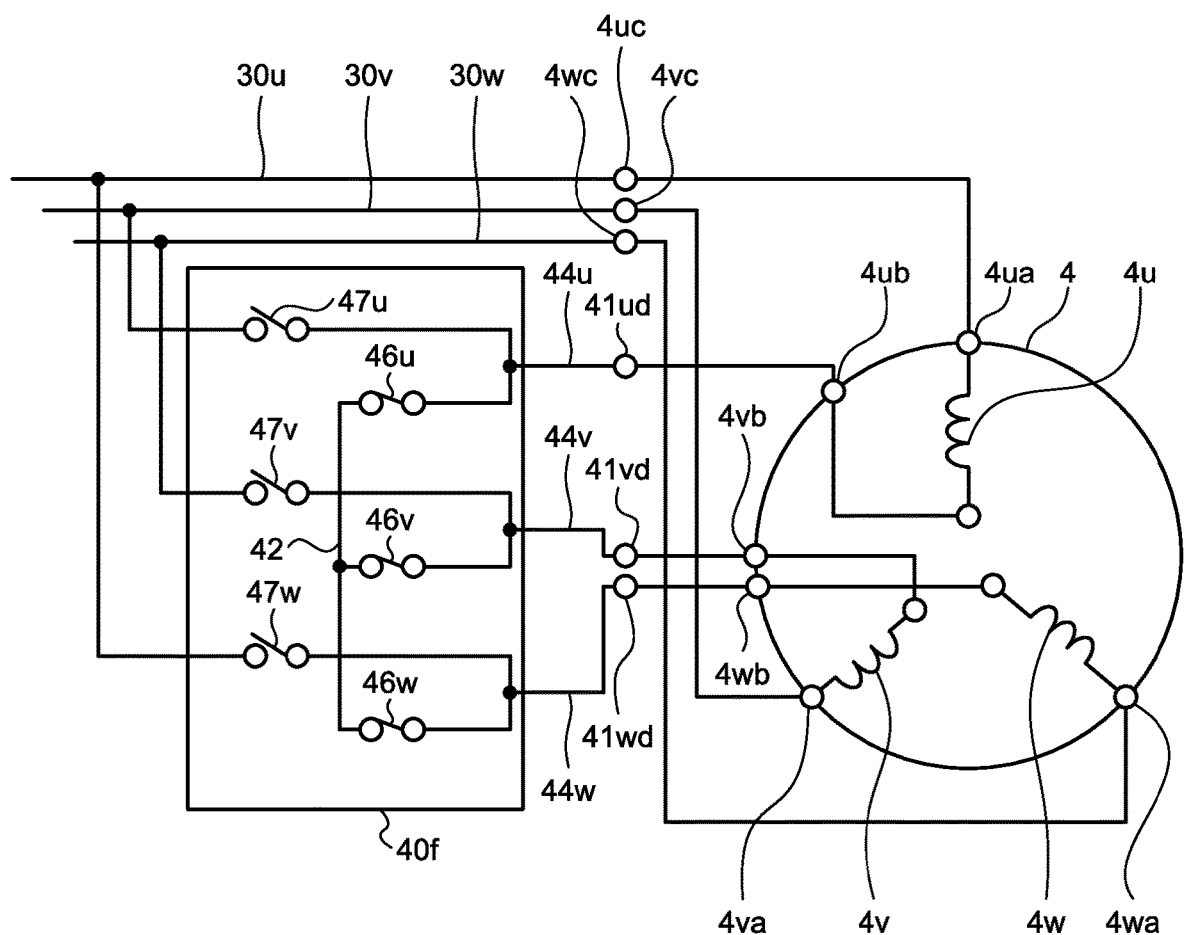
FIG. 16 is a wiring diagram illustrating an exemplary connection relationship between a wire connection switching unit provided in an electric motor drive device and each winding of an electric motor according to a seventh embodiment.

The wire connection switching unit provided in the electric motor drive device 2f will be described with reference to FIG. 16. FIG. 16 is a wiring diagram illustrating an exemplary connection relationship between the wire connection switching unit provided in the electric motor drive device 2f and each winding of the electric motor according to the seventh embodiment.

A wire connection switching unit 40f illustrated in FIG. 16 uses a normally closed switch 46u and a normally open switch 47u in combination instead of the changeover switch 41u of the wire connection switching unit 40 (see FIG. 2) described in the first embodiment, a normally closed switch 46v and a normally open switch 47v in combination instead of the changeover switch 41v, and a normally closed switch 46w and a normally open switch 47w in combination instead of the changeover switch 41w.

As illustrated in FIG. 16, when the normally closed switches 46u, 46v, and 46w are closed and the normally open switches 47u, 47v, and 47w are open, the stator winding of the electric motor 4 is in the star connection. In contrast, when the normally closed switches 46u, 46v, and 46w are open and the normally open switches 47u, 47v, and 47w are closed, the stator winding of the electric motor 4 is in the delta connection.

Suitable examples of switches for implementing the unit that switches the wire connection state of the stator winding of the electric motor 4, such as the wire connection switching unit 40 illustrated in FIG. 2 and the wire connection switching unit 40f illustrated in FIG. 16, are switches with small on-time conduction loss including mechanical switches such as relays and contactors.

However, in the configuration of switching the wire connection state using a combination of normally closed switches and normally open switches as illustrated in FIG. 16, wide bandgap (WBG) semiconductors such as silicon carbide (SiC) and gallium nitride (GaN) may be used for implementing normally closed switches and normally open switches. WBG semiconductors have low on-resistance, low loss, and little element heat generation. In addition, WBG semiconductors can perform switching operation at high speed. Therefore, WBG semiconductors are suitable for the configuration of switching the wire connection state while the electric motor 4 is being driven.

Further, in a case where the electric motor 4 is used for driving the compressor of an air conditioner and the wire connection switching unit 40*f* having the configuration illustrated in FIG. 16 is used, it is desirable to use normally-on type semiconductor switches as the switches that are turned on when the wire connection state adapted to small compressor loads (for example, the star connection state) is selected. This can reduce loss at light load, and when applied to an electric motor for driving the compressor of an air conditioner whose light load operation occupies a major proportion of the operation time, can increase the overall efficiency.

Except for the wire connection switching unit 40*f*, the electric motor drive device 2*f* has the same configuration as any one of the electric motor drive devices described in the first to sixth embodiments. That is, the electric motor drive device 2*f* is obtained by replacing the wire connection switching unit 40 of any of the electric motor drive devices described in the first to sixth embodiments with the wire connection switching unit 40*f*.

Eighth Embodiment

In each of the first to seventh embodiments, the electric motor drive device that drives the electric motor configured to be capable of switching the state of the stator winding between the star connection and the delta connection has been described. However, the configuration of the electric motor driven by the electric motor drive device according to the present invention is not limited to this.

The electric motor drive device according to the present invention can be applied, for example, to an electric motor including two or more winding portions as the winding of each phase and capable of switching the wire connection of the winding portions between parallel connection and series connection. In the electric motor with this configuration, both ends of each of the two or more winding portions constituting the winding of each phase can be connected to a device external to the electric motor, and the electric motor drive device switches the wire connection state. The electric motor drive device according to the present embodiment is referred to as an electric motor drive device 2*g*.

Figure 17:
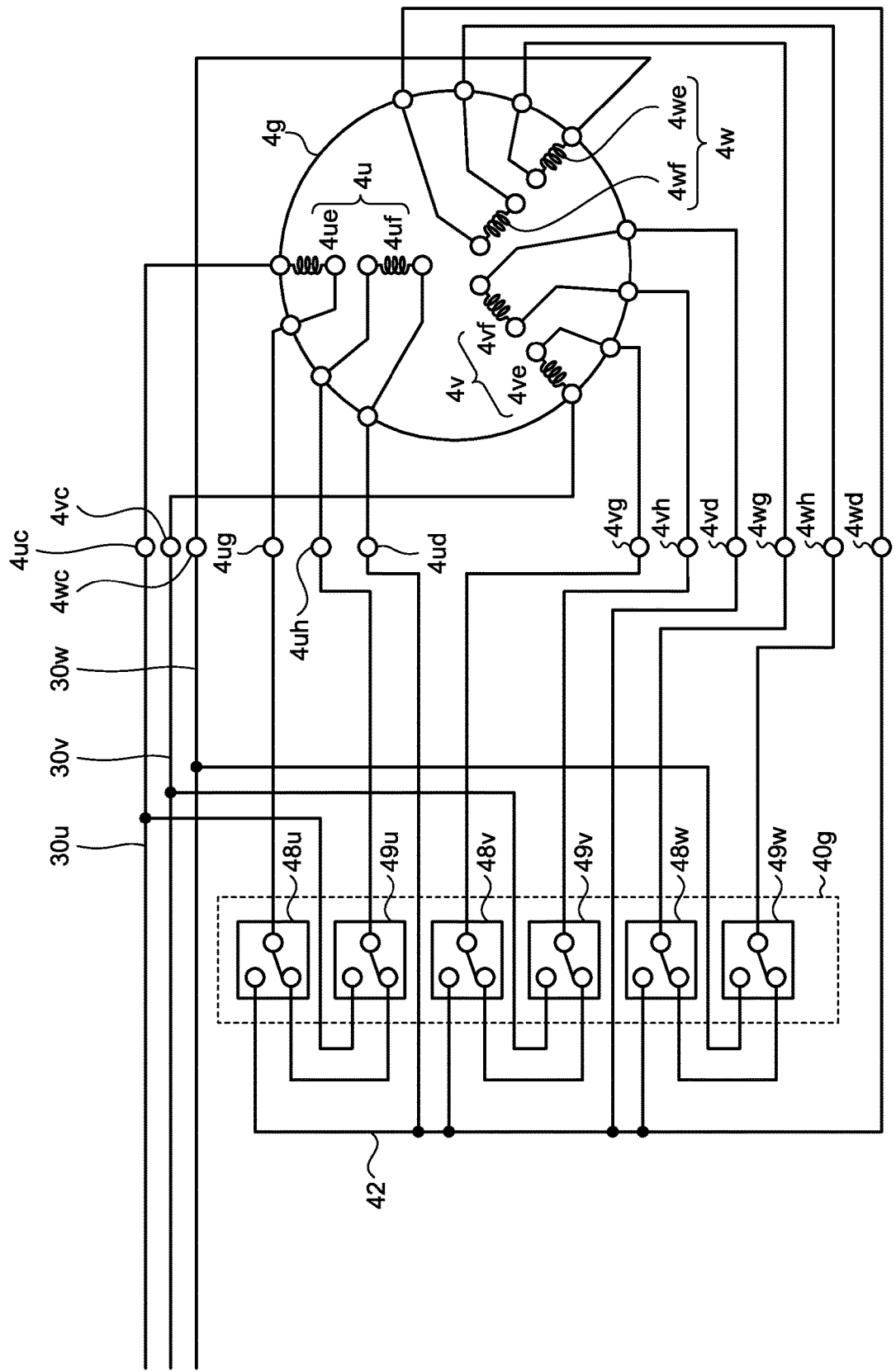
FIG. 17 is a wiring diagram illustrating an exemplary connection relationship between a wire connection switching unit provided in an electric motor drive device and each winding of an electric motor according to an eighth embodiment.

FIG. 17 is a wiring diagram illustrating an exemplary connection relationship between the wire connection switching unit provided in the electric motor drive device 2*g* and each winding of the electric motor according to the eighth embodiment. As illustrated in FIG. 17, the wire connection switching unit provided in the electric motor drive device 2*g* according to the eighth embodiment is referred to as a wire connection switching unit 40*g*. The electric motor driven by the electric motor drive device 2*g* is referred to as an electric motor 4*g*.

The wire connection switching unit 40*g* of the electric motor drive device 2*g* includes six changeover switches 48*u*, 48*v*, 48*w*, 49*u*, 49*v*, and 49*w*. The changeover switches 48*u* and 49*u* correspond to the u phase. The changeover switches 48*v* and 49*v* correspond to the v phase, and the changeover switches 48*w* and 49*w* correspond to the w phase.

The stator winding of the electric motor 4*g* includes a u-phase winding 4*u*, a v-phase winding 4*v*, and a w-phase winding 4*w*. The winding 4*u* includes two winding portions 4*ue* and 4*uf*, the winding 4*v* includes two winding portions 4*ve* and 4*vf*, and the winding 4*w* includes two winding portions 4*we* and 4*wf*.

The first ends of the winding portions 4*ue*, 4*ve*, and 4*we* are connected to the output lines 30*u*, 30*v*, and 30*w* of the inverter 30 via the external terminals 4*uc*, 4*vc*, and 4*wc*, respectively.

The second ends of the winding portions 4*ue*, 4*ve*, and 4*we* are connected to the common contacts of the changeover switches 48*u*, 48*v*, and 48*w* via external terminals 4*ug*, 4*vg*, and 4*wg*, respectively.

The first ends of the winding portions 4*uf*, 4*vf*, and 4*wf* are connected to the common contacts of the changeover switches 49*u*, 49*v*, and 49*w* via external terminals 4*uh*, 4*vh*, and 4*wh*, respectively.

The second ends of the winding portions 4*uf*, 4*vf*, and 4*wf* are connected to the neutral point node 42 via external terminals 4*ud*, 4*vd*, and 4*wd*, respectively.

The normally closed contacts of the changeover switches 48*u*, 48*v*, and 48*w* are connected to the normally closed contacts of the changeover switches 49*u*, 49, and 49*w*, respectively.

The normally open contacts of the changeover switches 48*u*, 48*v*, and 48*w* are connected to the neutral point node 42.

The normally open contacts of the changeover switches 49*u*, 49*v*, and 49*w* are connected to the output lines 30*u*, 30*v*, and 30*w* of the inverter 30, respectively.

In a case where the wire connection switching unit 40*g* and the electric motor 4*g* illustrated in FIG. 17 are applied, the overcurrent protection circuit described in each of the first to seventh embodiments can be applied to prevent an excessive current from flowing through the stator winding of the electric motor 4*g*. However, the threshold values to be generated by the first determination circuit and the second determination circuit constituting the overcurrent protection circuit are set as follows.

In the case of the configuration illustrated in FIG. 17, when the changeover switches 48*u*, 48*v*, 48*w*, 49*u*, 49*v*, and 49*w* are switched to the normally closed contact side as illustrated, the stator winding of the electric motor 4*g* is in a series-connected state. On the other hand, when the changeover switches 48*u*, 48*v*, 48*w*, 49*u*, 49*v*, and 49*w* are switched to the normally open contact side opposite to the illustrated state, the stator winding of the electric motor 4*g* is in a parallel-connected state. The ratio between the current flowing through the windings of the electric motor 4*g* and the inverter current differs for each of the series-connected state and the parallel-connected state. That is, in the series-connected state, the current flowing through the windings of the electric motor 4*g* is equal to the output current from the inverter 30, but in the parallel-connected state, the output current from the inverter 30 is double the current flowing through the windings of the electric motor 4*g*.

Therefore, in the case of controlling the inverter 30 such that the detection value of the inverter current does not exceed a certain threshold value for the purpose of preventing the magnet constituting the rotor from being demagnetized, the threshold value for the parallel connection needs to be double the threshold value for the series connection. That is, in a case where a total of two determination circuits corresponding to the respective wire connection states are provided, the threshold value used in the determination circuit corresponding to the parallel connection needs to be double the threshold value used in the determination circuit corresponding to the series connection.

As described in the seventh embodiment, the wire connection switching unit 40g may be implemented by a combination of normally closed switches and normally open switches, instead of the changeover switches.

In the present embodiment, in the electric motor 4g whose stator winding is in the star connection, the two winding portions of each phase are switched between the series connection and the parallel connection. However, this is only an example. The above-mentioned overcurrent protection circuit can be applied to the configuration of switching the two winding portions of each phase between the series connection and the parallel connection in an electric motor whose stator winding is in the delta connection.

In this way, even with the electric motor drive device that drives the electric motor configured to be capable of switching the state of the stator winding of each phase between the state in which the two winding portions are connected in series and the state in which the two winding portions are connected in parallel, it is still possible to determine whether an excessive current is flowing through the windings using an appropriate threshold value corresponding to each wire connection state. Therefore, the performance of the protection function for preventing the permanent magnet constituting the rotor from being demagnetized can be enhanced.

Modification 1

The overcurrent protection circuit of the electric motor drive device described in each of the first to eighth embodiments detects the input current to the inverter 30, determines whether the value of the current flowing through the electric motor is normal based on the detection result, and stops the inverter 30 to protect the electric motor if the current value is abnormal. However, the output current from the inverter 30 may be detected instead of the input current to the inverter 30, and control may be performed using the output current.

In the configuration of detecting the output current from the inverter 30, a current detection element, e.g. a current transformer, may be provided in only one phase, and overcurrent detection may be performed based on the current in the one phase. Alternatively, a current detection element may be provided in each of the three phases, and overcurrent detection may be performed using the average value or instantaneous value of the currents detected in the three phases. Still alternatively, a current detection element may be provided in each of freely-selected two phases, and overcurrent detection may be performed using the average value or instantaneous value of the currents detected in the two phases.

Modification 2

In the electric motor drive device according to each of the above-described embodiments, the stator winding of the electric motor to be driven can take either of the two wire connection states. That is, the overcurrent protection circuit of the electric motor drive device includes two determination circuits that perform determination using two threshold values corresponding to the two wire connection states, and invalidates, as necessary, the determination process with the threshold value other than the threshold value corresponding to the wire connection state. However, the number of switchable wire connection states is not limited to two. The present invention is also applicable to a case where the electric motor can take three or more wire connection states. That is, in general, the present invention can be applied to any electric motor that can select one of a plurality of wire connection states. For example, in a case where the electric motor can take three or more wire connection states, the overcurrent protection circuit of the electric motor drive device includes a plurality of determination circuits that are equivalent in number to that of wire connection states and are each correlated one-to-one with any one of the three or more wire connection states. Each of the determination circuits determines whether the current flowing through the stator winding of the motor is in an excessive state using a threshold value associated with the corresponding connection state. The overcurrent protection circuit further includes a combining circuit that combines and outputs the determination results in the plurality of determination circuits, and an invalidation circuit that invalidates some of the determination processes in the plurality of determination circuits and causes the combining circuit to output the determination result by the determination circuit corresponding to the wire connection state.

In this case, the overcurrent protection circuit detects the input current to or the output current from the inverter as the inverter current, and stops the inverter when the detected inverter current is excessive. The plurality of determination circuits of the overcurrent protection circuit correspond to the plurality of wire connection states, respectively. Each of the determination circuits uses a threshold value set according to the correlated wire connection state as a reference value, and compares the reference value with the detected inverter current. Among the comparison processes in the plurality of determination circuits, the invalidation circuit invalidates, as necessary, the comparison processes in the determination circuits other than the determination circuit correlated with the selected wire connection state to cause the output from the combining circuit to match the output from the determination circuit correlated with the selected wire connection state.

In the configurations described in the first to fourth embodiments (see FIGS. 1 to 10), when the number of wire connection states is generalized from two to plural (n, 2<n), the combining circuit only needs to include an OR circuit that performs an OR operation on outputs from the plurality of determination circuits. Considering the determination circuit corresponding to the selected wire connection state as the first determination circuit and the determination circuits other than the first determination circuit as the second determination circuits, the invalidation circuit only needs to be configured such that each of the second determination circuits performs the comparison process using a reference value larger than the reference value used for the comparison process in the first determination circuit.

In this case, each of the plurality of determination circuits includes a threshold value generation circuit and a comparator. The threshold value generation circuit includes a voltage dividing circuit that divides the control voltage supplied from the control power supply, and it outputs the voltage appearing at the voltage dividing node of the voltage dividing circuit as a threshold value. The comparator determines, using the threshold value output from the threshold value generation circuit as a reference value, whether the detected inverter current is larger than the reference value. Each voltage dividing circuit includes a plurality of resistors connected in series between the control power supply and the ground. Then, the invalidation circuit short-circuits one of the plurality of resistors connected in series in the voltage dividing circuit of each of the determination circuits corresponding to the second determination circuits, and causes the voltage dividing node to output a value larger than the threshold value used in the determination circuit corresponding to the first determination circuit, instead of the threshold value that is used when each of the determination circuits is the first determination circuit. Of the resistors provided in the voltage dividing circuit, the resistor to be short-circuited by the invalidation circuit is, for example, a resistor connected between the voltage dividing node and the control power supply.

In the configurations described in the fifth and sixth embodiments (see FIGS. 11 to 15), when the number of wire connection states is generalized from two to plural (n, 2<n), the combining circuit only needs to include an AND circuit that performs an AND operation on outputs from the plurality of determination circuits. Considering the determination circuit corresponding to the selected wire connection state as the first determination circuit and the determination circuits other than the first determination circuit as the second determination circuits, the invalidation circuit only needs to be configured such that each of the second determination circuits performs the comparison process using a reference value smaller than the reference value used for the comparison process in the first determination circuit.

In this case, each of the plurality of determination circuits includes a threshold value generation circuit and a comparator. The threshold value generation circuit includes a voltage dividing circuit that divides the control voltage supplied from the control power supply, and it outputs the voltage appearing at the voltage dividing node of the voltage dividing circuit as a threshold value. The comparator determines, using the threshold value output from the threshold value generation circuit as a reference value, whether the detected inverter current is larger than the reference value. Each voltage dividing circuit includes a plurality of resistors connected in series between the control power supply and the ground. Then, the invalidation circuit short-circuits one of the plurality of resistors connected in series in the voltage dividing circuit of each of the determination circuits corresponding to the second determination circuits, and causes the voltage dividing node to output a value smaller than the threshold value used in the determination circuit corresponding to the first determination circuit, instead of the threshold value that is used when each of the determination circuits is the first determination circuit. Of the resistors provided in the voltage dividing circuit, the resistor to be short-circuited by the invalidation circuit is, for example, a resistor connected between the voltage dividing node and the ground.

The configurations described in the above-mentioned embodiments indicate examples of the contents of the present invention. The configurations can be combined with another well-known technique, and some of the configurations can be omitted or changed in a range not departing from the gist of the present invention.

The invention claimed is:

1. An electric motor drive device for driving an electric motor capable of switching a wire connection state of a stator winding, the electric motor drive device comprising:
a wire connection switch to switch the wire connection state of the stator winding;
an inverter to generate electric power to be supplied to the electric motor;
a control device to control the wire connection switch and the inverter; and
an overcurrent protection circuit to prevent a current exceeding a predetermined value from continuously flowing through the electric motor, wherein
the overcurrent protection circuit includes:
a plurality of determination circuits each correlated one-to-one with a different one of a plurality of possible wire connection states of the stator winding, the plurality of determination circuits being configured to independently determine whether a current flowing through the inverter when the inverter has a corresponding wire connection state has an abnormal value;
a combining circuit to combine a plurality of determination results in received from the plurality of determination circuits, respectively; and
an invalidation circuit configured to invalidate a determination process by one or more of the plurality of determination circuits, and cause the combining circuit to output only a determination result by a selected determination circuit from the plurality of determination circuits that is correlated with a selected wire connection state of the stator winding, and
when the determination result output from the combining circuit indicates that the current flowing through the inverter has an abnormal value, the control device stops the inverter.

2. The electric motor drive device according to claim 1, wherein
the inverter supplies AC power with variable frequency to the electric motor to drive the electric motor at variable speed, and
the control device controls the wire connection switch to cause the wire connection switch to select the wire connection state and controls the inverter to cause the inverter to supply the AC power to the electric motor.

3. The electric motor drive device according to claim 1, wherein
the overcurrent protection circuit includes a current detection circuit to detect an input current to or an output current from the inverter, and output a current detection value as a detection result to each of the plurality of determination circuits,
each of the plurality of determination circuits uses a threshold value determined uniquely for each of the determination circuits on a basis of the correlated wire connection state, and determines whether the current detection value exceeds the threshold value, and
the invalidation circuit invalidates, as necessary, a determination process by the determination circuits other than the determination circuit corresponding to the selected wire connection state to cause an output from the combining circuit to match an output from the determination circuit corresponding to the selected wire connection state.

4. An electric motor drive device for driving an electric motor capable of switching a wire connection state of a stator winding, the electric motor drive device comprising:
a wire connection switch to switch the wire connection state of the stator winding;
an inverter to generate electric power to be supplied to the electric motor;
a control device to control the wire connection switch and the inverter; and
an overcurrent protection circuit to prevent a current exceeding a predetermined value from continuously flowing through the electric motor, wherein
the overcurrent protection circuit includes:
a plurality of determination circuits each correlated one-to-one with any one of a plurality of possible wire connection states of the stator winding, the plurality of determination circuits being configured to determine whether a current flowing through the inverter has an abnormal value;
a combining circuit to combine determination results in the plurality of determination circuits; and
an invalidation circuit to invalidate a determination process by one or more of the plurality of determination circuits, and cause the combining circuit to output a determination result by the determination circuit correlated with a selected wire connection state of the stator winding,
when the determination result output from the combining circuit indicates that the current flowing through the inverter has an abnormal value, the control device stops the inverter,
the overcurrent protection circuit includes a current detection circuit to detect an input current to or an output current from the inverter, and output a current detection value as a detection result to each of the plurality of determination circuits,
each of the plurality of determination circuits uses a threshold value determined uniquely for each of the determination circuits on a basis of the correlated wire connection state, and determines whether the current detection value exceeds the threshold value,
the invalidation circuit invalidates, as necessary, a determination process by the determination circuits other than the determination circuit corresponding to the selected wire connection state to cause an output from the combining circuit to match an output from the determination circuit corresponding to the selected wire connection state,
the combining circuit includes an OR circuit to perform an OR operation on outputs from the plurality of determination circuits, and
the invalidation circuit causes the determination circuits other than the determination circuit corresponding to the selected wire connection state to perform a determination process using a threshold value larger than the threshold value used by the determination circuit corresponding to the selected wire connection state.

5. The electric motor drive device according to claim 4, wherein
the determination circuits include:
a threshold value generation circuit including a voltage dividing circuit including a plurality of resistors connected in series between a control power supply and ground, the voltage dividing circuit being configured to divide a control voltage supplied from the control power supply, the threshold value generation circuit being configured to output a voltage appearing at a voltage dividing node of the voltage dividing circuit as the threshold value determined based on the correlated wire connection state; and
a comparator to compare the threshold value output from the threshold value generation circuit with the current detection value, wherein
considering the determination circuit corresponding to the selected wire connection state as a first determination circuit and the determination circuits other than the first determination circuit as second determination circuits,
the invalidation circuit short-circuits one of the plurality of series-connected resistors of the voltage dividing circuit provided in each of the second determination circuits, and causes the voltage dividing node of each of the second determination circuits to output a voltage larger than the threshold value used by the first determination circuit.

6. The electric motor drive device according to claim 5, wherein
the invalidation circuit short-circuits a resistor connected between the voltage dividing node of the second determination circuits and the control power supply.

7. An electric motor drive device for driving an electric motor capable of switching a wire connection state of a stator winding, the electric motor drive device comprising:
a wire connection switch to switch the wire connection state of the stator winding;
an inverter to generate electric power to be supplied to the electric motor;
a control device to control the wire connection switch and the inverter; and
an overcurrent protection circuit to prevent a current exceeding a predetermined value from continuously flowing through the electric motor,
wherein
the overcurrent protection circuit includes:
a plurality of determination circuits each correlated one-to-one with any one of a plurality of possible wire connection states of the stator winding, the plurality of determination circuits being configured to determine whether a current flowing through the inverter has an abnormal value;
a combining circuit to combine determination results in the plurality of determination circuits; and
an invalidation circuit to invalidate a determination process by one or more of the plurality of determination circuits, and cause the combining circuit to output a determination result by the determination circuit correlated with a selected wire connection state of the stator winding,
when the determination result output from the combining circuit indicates that the current flowing through the inverter has an abnormal value, the control device stops the inverter,
the overcurrent protection circuit includes a current detection circuit to detect an input current to or an output current from the inverter, and output a current detection value as a detection result to each of the plurality of determination circuits,
each of the plurality of determination circuits uses a threshold value determined uniquely for each of the determination circuits on a basis of the correlated wire connection state, and determines whether the current detection value exceeds the threshold value,
the invalidation circuit invalidates, as necessary, a determination process by the determination circuits other than the determination circuit corresponding to the selected wire connection state to cause an output from the combining circuit to match an output from the determination circuit corresponding to the selected wire connection state,
the combining circuit includes an AND circuit to perform an AND operation on outputs from the plurality of determination circuits, and
the invalidation circuit causes the determination circuits other than the determination circuit corresponding to the selected wire connection state to perform a determination process using a threshold value smaller than the threshold value used by the determination circuit corresponding to the selected wire connection state.

8. The electric motor drive device according to claim 7, wherein
the determination circuits include:
a threshold value generation circuit including a voltage dividing circuit including a plurality of resistors connected in series between a control power supply and ground, the voltage dividing circuit being configured to divide a control voltage supplied from the control power supply, the threshold value generation circuit being configured to output a voltage appearing at a voltage dividing node of the voltage dividing circuit as the threshold value determined based on the correlated wire connection state; and
a comparator to compare the threshold value output from the threshold value generation circuit with the current detection value, wherein
considering the determination circuit corresponding to the selected wire connection state as a second determination circuit and the determination circuits other than the second determination circuit as first determination circuits,
the invalidation circuit short-circuits one of the plurality of series-connected resistors of the voltage dividing circuit provided in each of the first determination circuits, and causes the voltage dividing node of each of the first determination circuits to output a voltage smaller than the threshold value used by the second determination circuit.

9. The electric motor drive device according to claim 8, wherein
the invalidation circuit short-circuits a resistor connected between the voltage dividing node of the first determination circuits and the ground.

10. The electric motor drive device according to claim 5, wherein
the invalidation circuit includes a transistor for short-circuiting the resistor.

11. The electric motor drive device according to claim 10, wherein
the transistor is a digital transistor.

12. The electric motor drive device according to claim 1, wherein
the plurality of wire connection states are a star connection state and a delta connection state.

13. The electric motor drive device according to claim 12, wherein
the threshold value used for a determination process in the determination circuit corresponding to the delta connection state is equal to or less than $\sqrt{3}$ times the threshold value used for a determination process in the determination circuit corresponding to the star connection state.

14. The electric motor drive device according to claim 1, wherein
the wire connection switch includes a semiconductor switch.

15. The electric motor drive device according to claim 14, wherein
the semiconductor switch is formed of a wide bandgap semiconductor.

16. The electric motor drive device according to claim 1, further comprising
an inverter drive circuit to supply a drive signal to the inverter, wherein
the inverter and the inverter drive circuit are implemented by an intelligent power module,
an output from the combining circuit is input to an overcurrent cutoff port of the intelligent power module, and
the inverter drive circuit stops the inverter when a signal input to the overcurrent cutoff port indicates that the current flowing through the inverter has an abnormal value.

17. The electric motor drive device according to claim 16, wherein
the control device includes a microcontroller to generate an on/off control signal for on/off control of the inverter and supply the on/off control signal to the inverter drive circuit,
the output from the combining circuit is input to the microcontroller, and
the microcontroller stops outputting the on/off control signal when a signal input from the combining circuit indicates that the current flowing through the inverter has an abnormal value.

18. The electric motor drive device according to claim 1, further comprising:
an inverter drive circuit to supply a drive signal to the inverter; and
a microcontroller to generate an on/off control signal for on/off control of the inverter and supply the on/off control signal to the inverter drive circuit, wherein
among the threshold values used for the determination processes in the determination circuits, the threshold value used for the determination process in the determination circuit invalidated by the invalidation circuit is supplied to the microcontroller, and
the microcontroller determines whether the overcurrent protection circuit is operating normally based on the threshold value supplied, and stops the inverter when the overcurrent protection circuit is not operating normally.

19. The electric motor drive device according to claim 18, wherein
the microcontroller stops outputting the on/off control signal and stops the inverter when the overcurrent protection circuit is not operating normally.

20. The electric motor drive device according to claim 8, wherein
the invalidation circuit includes a transistor for short-circuiting the resistor.

21. The electric motor drive device according to claim 20, wherein
the transistor is a digital transistor.

* * * * *